United States Patent
Salesin et al.

(10) Patent No.: US 6,631,240 B1
(45) Date of Patent: Oct. 7, 2003

(54) MULTIRESOLUTION VIDEO

(75) Inventors: David H. Salesin, Seattle, WA (US); Charles E. Jacobs, Issaquah, WA (US); Adam Finkelstein, Princeton, NJ (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/120,391

(22) Filed: Jul. 21, 1998

Related U.S. Application Data

(60) Provisional application No. 60/053,542, filed on Jul. 23, 1997.

(51) Int. Cl.$^7$ .......................... H04N 5/783; H04N 7/12; H04B 1/66
(52) U.S. Cl. ...................... 386/68; 386/111; 375/240.08
(58) Field of Search .............................. 386/33, 6–8, 4, 386/68, 81–82, 111–112; 375/240, 240.01, 240.08; 382/232, 243; 348/384.1; H04N 5/76, 5/783, 9/79

(56) References Cited

U.S. PATENT DOCUMENTS

| | | | | |
|---|---|---|---|---|
| 6,028,608 A | * | 2/2000 | Jenkins | 345/433 |
| 6,091,777 A | * | 7/2000 | Guetz et al. | 375/240 |
| 6,272,253 B1 | * | 8/2001 | Bannon et al. | 382/236 |

* cited by examiner

*Primary Examiner*—Thai Tran
(74) *Attorney, Agent, or Firm*—Ronald M. Anderson

(57) ABSTRACT

A representation for encoding time varying image data that allows for varying spatial and temporal resolutions in different parts of a video sequence. The representation, called multiresolution video, is based on a sparse, hierarchical encoding of the video data as multiple streams. Operations are defined for creating, viewing, and editing multiresolution video sequences. These operations support a variety of applications, including multiresolution playback, motion-blurred "fast forward" and "reverse," constant speed display, enhanced video shuttling or searching, and "video clip-art" editing and compositing. The multiresolution representation requires little storage overhead, and the algorithms using the representation are both simple and efficient.

21 Claims, 16 Drawing Sheets

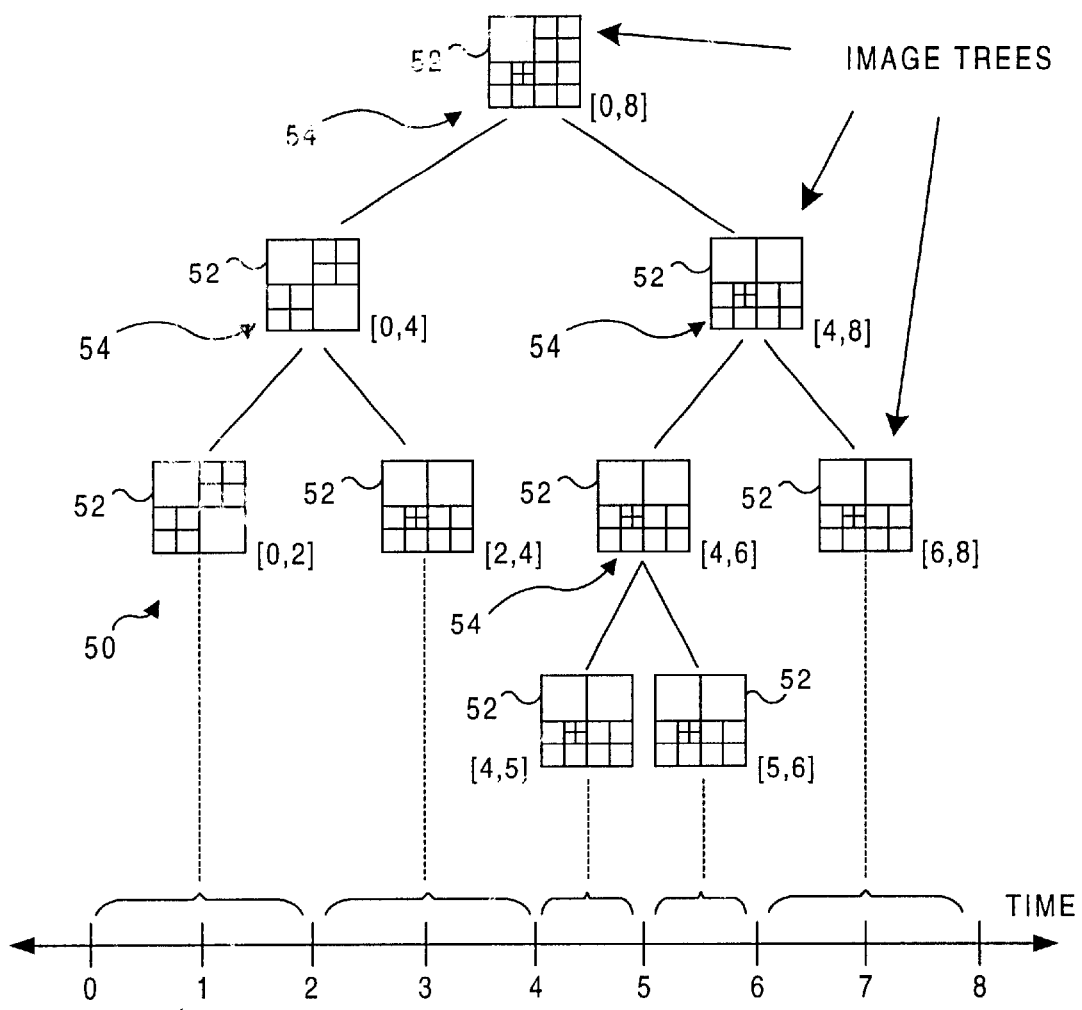
FIG. 1
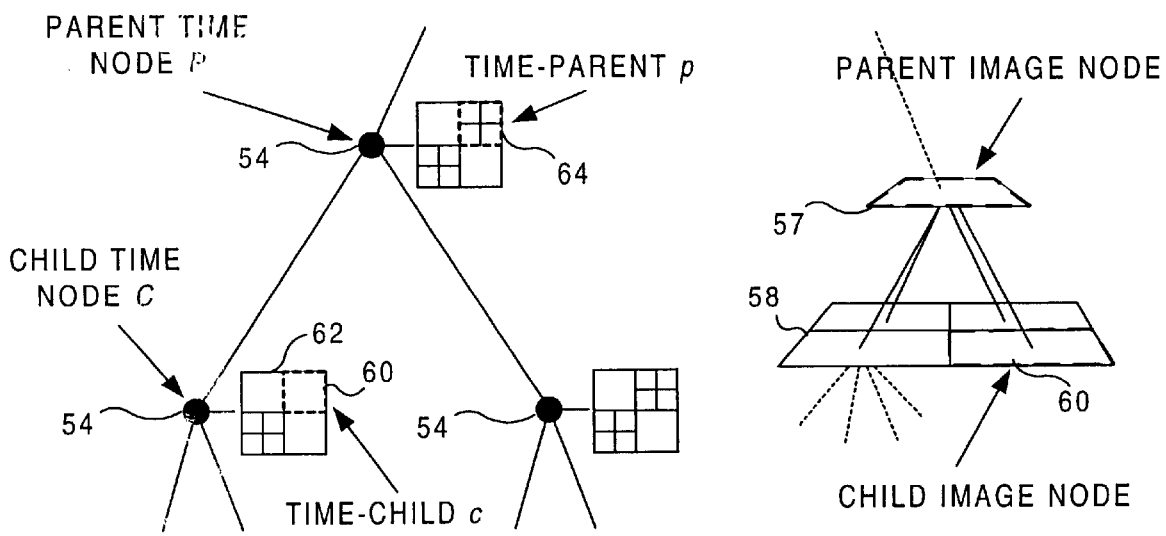
FIG. 2A
FIG. 2B

MULTIRESOLUTION VIDEO

RELATED APPLICATIONS

This application is a continuation-in-part of U.S. provisional patent application, Serial No. 60/053,542, filed Jul. 23, 1997, the benefit of the filing date of which is hereby claimed under 35 U.S.C. §§119(e) and 120.

GOVERNMENT RIGHTS

This invention was made with government support under grant number N00014-95-1-0728 awarded by the Department of the Navy and NSF Grant No. CCR-9553199. The Government has certain rights to the invention.

FIELD OF THE INVENTION

The present invention generally relates to representing time-varying video data, and more specifically, to a method and system for creating, viewing and editing video data encoded to include different spatial and/or time resolutions.

BACKGROUND OF THE INVENTION

Scientists often run physical simulations of time-varying data in which different parts of the simulation are performed at differing spatial and temporal resolutions. For example, in a simulation of the air flow about an airplane wing, it is useful to run the slowly-varying parts of the simulation—generally, the portion of space further from the wing—at a fairly coarse scale, both spatially and temporally, while running the more complex parts—say, the region of turbulence just aft of the wing—at a much higher resolution. The multi-grid techniques frequently used for solving large-scale problems in physics, astronomy, meteorology, and applied mathematics are a common example of this kind of computation.

However, it has been recognized that a new approach, called multiresolution video, needs to be developed for representing the time-varying data produced by such algorithms. This multiresolution video representation should provide means for capturing time-varying image data produced at multiple scales, both spatially and temporally. In addition, it should permit efficient algorithms to be used for viewing multiresolution video at arbitrary scales and speeds. For example, in a sequence depicting the flow of air about a wing, a user should be able to interactively zoom in on an area of relative turbulence, computed at an enhanced spatial resolution. Analogously, fast-changing components in a scene should be represented and viewable at a higher temporal resolution, allowing, for example, a propeller blade to be viewed in slow motion.

Moreover, multiresolution video will preferably have applications that are useful even for conventional uniresolution video. First, the representation should facilitate a variety of viewing applications, such as multiresolution playback, including motion-blurred "fast-forward" and "reverse"; constant-speed viewing of video over a network with varying throughput; and an enhanced form of video "shuttling" or searching. The representation should also provide a controlled degree of lossy compression, particularly in areas of the video that change little from frame to frame. Finally, the representation should support the assembly of complex multiresolution videos from either uniresolution or multiresolution "video clip-art" elements.

Multiresolution representations that have previously been proposed for images include "image pyramids" (see "A Hierarchical Data Structure for Picture Processing," S. L. Tanimoto and T. Pavlidis, *Computer Graphics and Image Processing*, 4(2):104–119, June 1975) and "MIP maps" (see "Pyramidal Parametrics," L. Williams, *Computer Graphics (SIGGRAPH '83 Proceedings)*, volume 17, pages 1–11, July 1983). A related approach uses wavelet-based representations for images as described in "Multiresolution Painting and Compositing," by D. F. Berman, J. T. Bartell, and D. H. Salesin, *Proceedings of SIGGRAPH '94*, Computer Graphics Proceedings, Annual Conference Series, pages 85–90, July 1994 and by K. Perlin and L. Velho in "Live paint: Painting with Procedural Multiscale Textures, *Proceedings of SIGGRAPH 95*, Computer Graphics Proceedings, Annual Conference Series, pages 153–160, August 1995. These latter works disclose a representation that is sparse, and which supports efficient compositing operations for assembling complex frames from simpler elements, but which lack other desirable capabilities.

Several commercially available video editing systems support many of the operations of the multiresolution video that are applicable to uniresolution video. For example, Adobe Corporation's AFTER EFFECTS™ allows the user to view video segments at low resolution and to construct an edit list that is later applied to the high-resolution frames offline. Discrete Logic's FLAME AND FLINT™ systems also provide digital video compositing and many other digital editing operations on videos of arbitrary resolution. J. Swartz and B. C. Smith describe a language for manipulation of video segments in a resolution-independent fashion in "A Resolution Independent Video Language," *ACM Multimedia 95*, pages 179–188, ACM, Addison-Wesley, November 1995. However, the input and output from all of these prior art systems is uniresolution video.

Multiresolution video also allows the user to pan and zoom to explore a flat video environment. This style of interaction is similar in spirit to two image-based environments, including Apple Computer's QUICKTIME VR™ and the "plenoptic modeling" system of L. McMillan and G. Bishop, as described in "Plenoptic Modeling: An Image-based Rendering System," *Proceedings of SIGGRAPH '95*, Computer Graphics Proceedings, Annual Conference Series, pages 39–46, August 1995. These prior art methods provide an image-based representation of an environment that surrounds the viewer. It would be desirable to combine such methods with multiresolution video to create a kind of "multiresolution video QUICKTIME VR," in which a viewer can investigate a panoramic environment by panning and zooming, with the environment changing in time and having different amounts of detail in different locations.

Furthermore, it would be desirable to provide for a simple form of lossy compression applicable to the multiresolution video. Video compression is a heavily studied area. MPEG and Apple Corporation's QUICKTIME™ are two industry standards. Other techniques based on multiscale transforms, as discussed by A. S. Lewis and G. Knowles in "Video Compression Using 3D Wavelet Transforms," *Electronics Letters*, 26(6):396–398, Mar. 15, 1990, and by A. N. Netravali and B. G. Haskell in *Digital Pictures*, Plenum Press, New York, 1988, might be adapted to work for multiresolution video.

SUMMARY OF THE INVENTION

In accord with the present invention, a method is defined for storing video data that comprise multiple frames so as to provide independent image resolution and time resolution when displaying the video data. The method includes the step of providing a data structure for storing the video data in a memory medium. A flow of time for the video data is encoded in a first portion of the data structure, and a spatial decomposition of the multiple frames of the video data is encoded in a second portion of the data structure that is linked to the first portion of the data structure. The first and second portions of the data structure are decoupled sufficiently from each other so as to enable the video data to be read from the memory medium and displayed with separately selectively variable spatial resolutions and temporal resolutions. Thus, the spatial resolution is generally selectively variable independent of the temporal resolution, and the temporal resolution is generally selectively variable independent of the spatial resolution.

The method preferably further includes the step of writing the video data in the data structure to the memory medium for storage. The amount of storage required to store the video data at a selected spatial resolution and a selected temporal resolution is substantially dependent upon the resolution.

The method also may include the step of transmitting the video data in the data structure over a communication link. At least one of the spatial resolution and the temporal resolution of the video data being transmitted is then automatically variable to fit within an available bandwidth of the communication link. Therefore, if the available bandwidth of the communication link varies during transmission of the video data, the method may include the step of automatically varying at least one of the spatial resolution and the temporal resolution in accord with the varying bandwidth of the communication link.

In addition, the method may include the step of displaying the video data stored on the medium in the data structure on a display device having a limited resolution, and automatically varying the spatial resolution of the video data being played to conform to the limited resolution of the display device.

A fast forward of the video data stored in the data structure can be provided by varying the temporal resolution of the video data displayed in a forward play direction. Similarly, a fast reverse of the video data stored in the data structure can be provided by varying the temporal resolution of the video data displayed in a reverse play direction. Searching of the video data stored in the data structure is enabled by varying the temporal resolution of the video data when displayed, so that frames of the video data are displayed at a rate substantially faster than normal.

Video data that are at a relatively higher resolution are resampled to produce additional video data having either a relatively lower temporal resolution or a lower spatial resolution, for storage in the data structure. It should also be apparent that the video data stored in the data structure can have a dynamically varying spatial resolution and a dynamically varying temporal resolution.

Preferably, the data structure comprises a sparse binary tree for encoding the flow of time and sparse quadtrees for encoding the spatial decomposition of frames of the video data. The method may also include the step of enabling lossy compression of the data structure.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a schematic diagram showing an exemplary binary tree of quadtrees as used in the present invention for encoding spatial and time information for a video;

FIGS. 2A and 2B respectively schematically illustrate a time tree and an image tree in accord with the present invention;

FIGS. 7A–7C illustrate increasingly higher detail, and FIGS. 7D and 7E illustrate increasing motion blur;

Figure 12A:
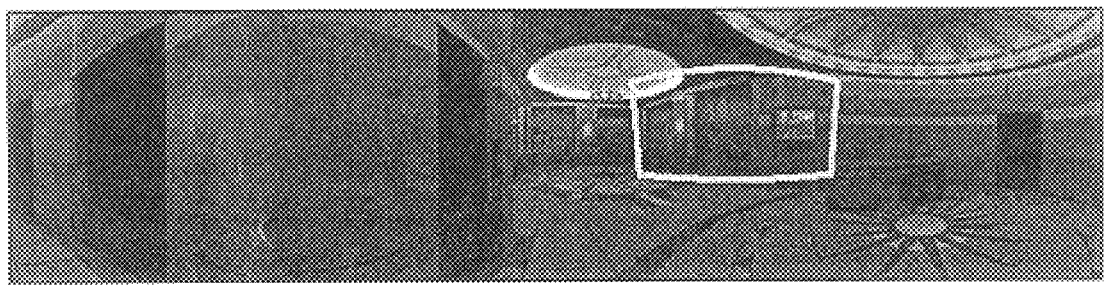
Figure 12B:
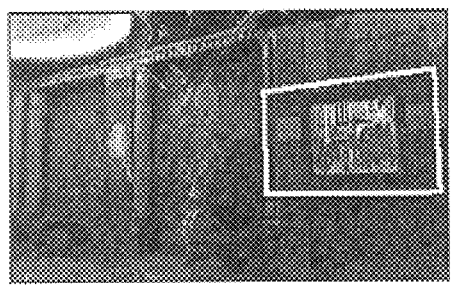
Figure 12C:
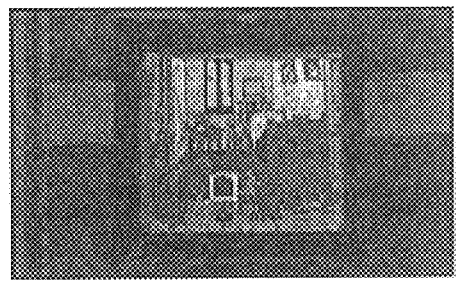
Figure 13:
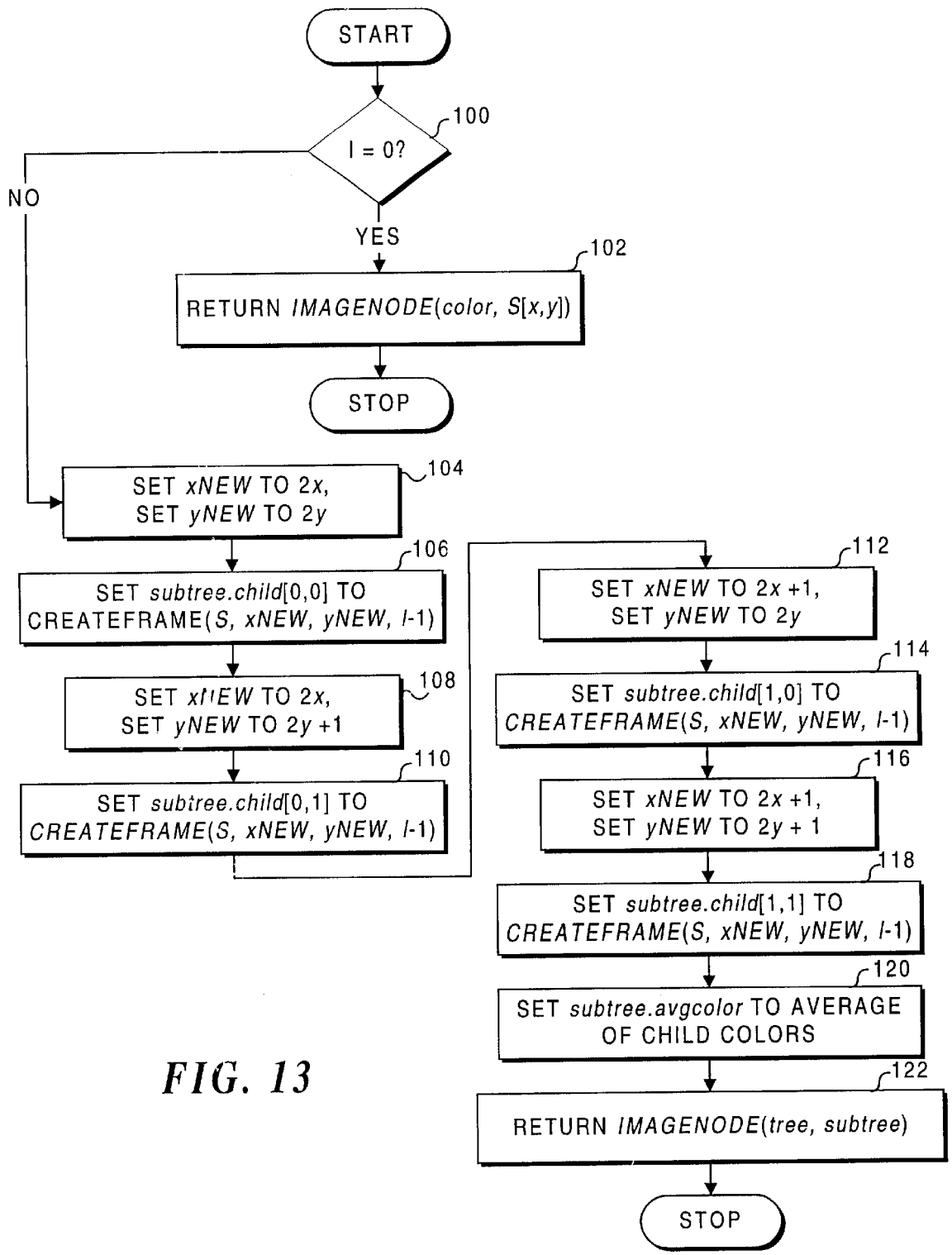
Figure 14:
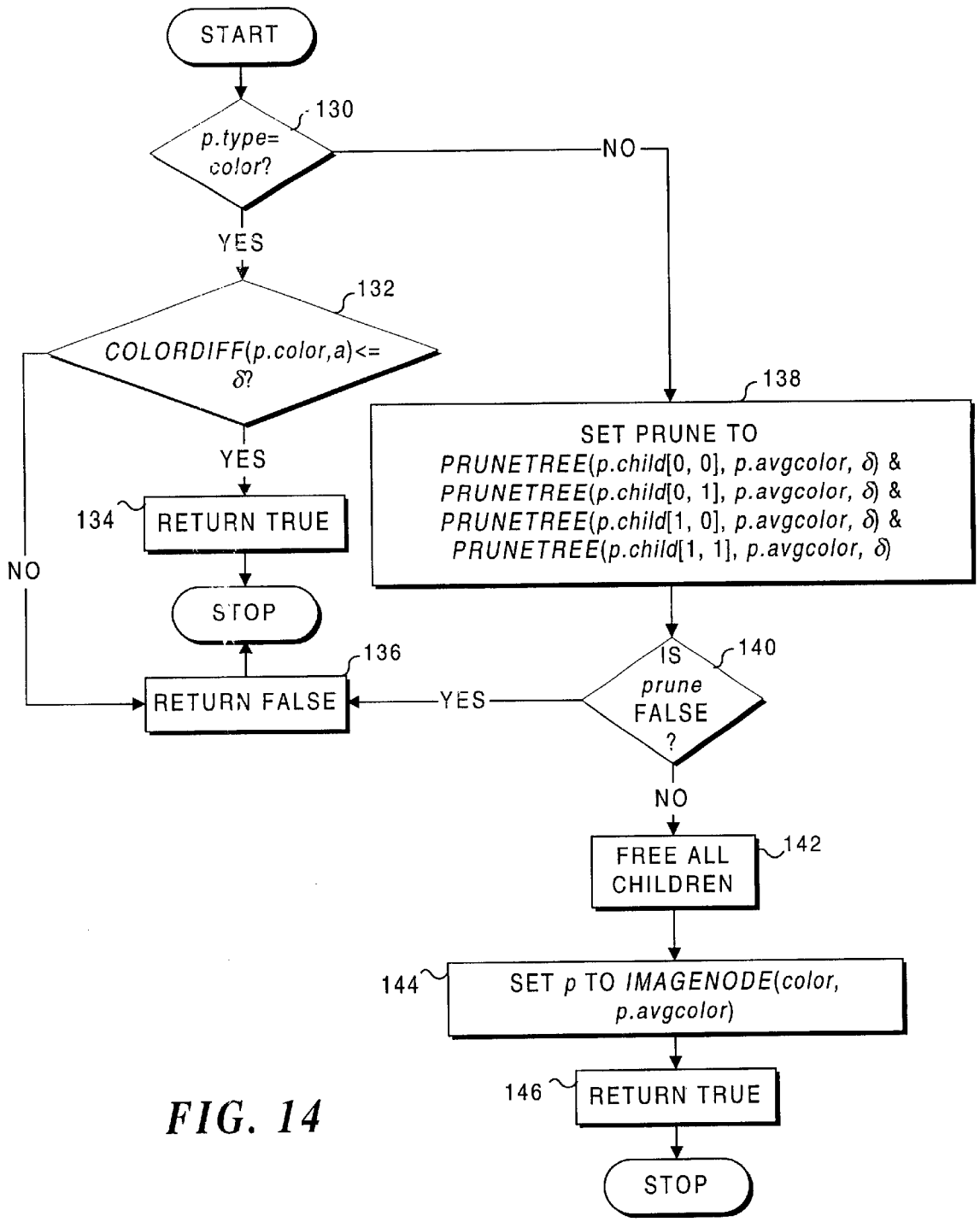
Figure 15:
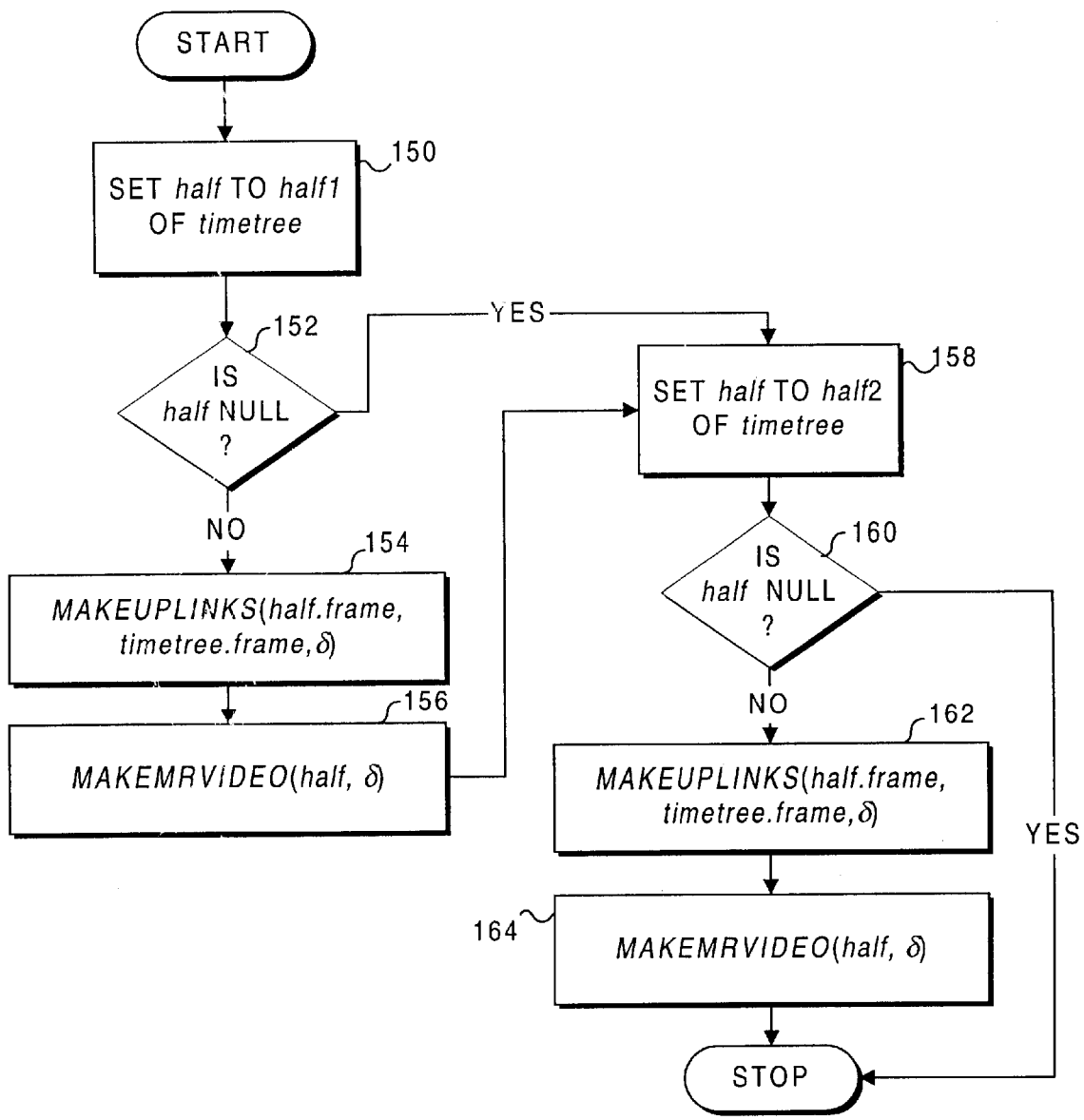
Figure 16:
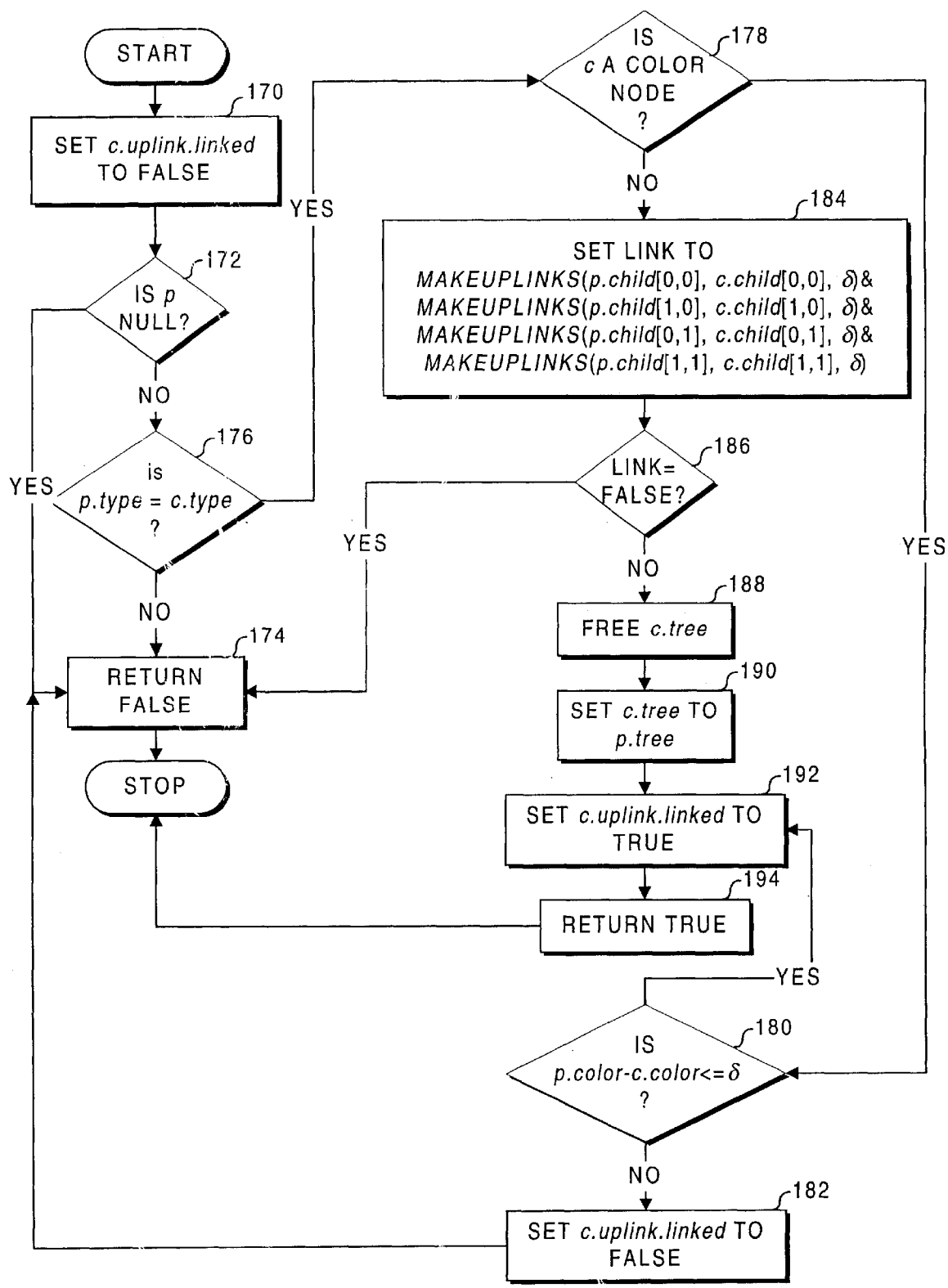
Figure 17:
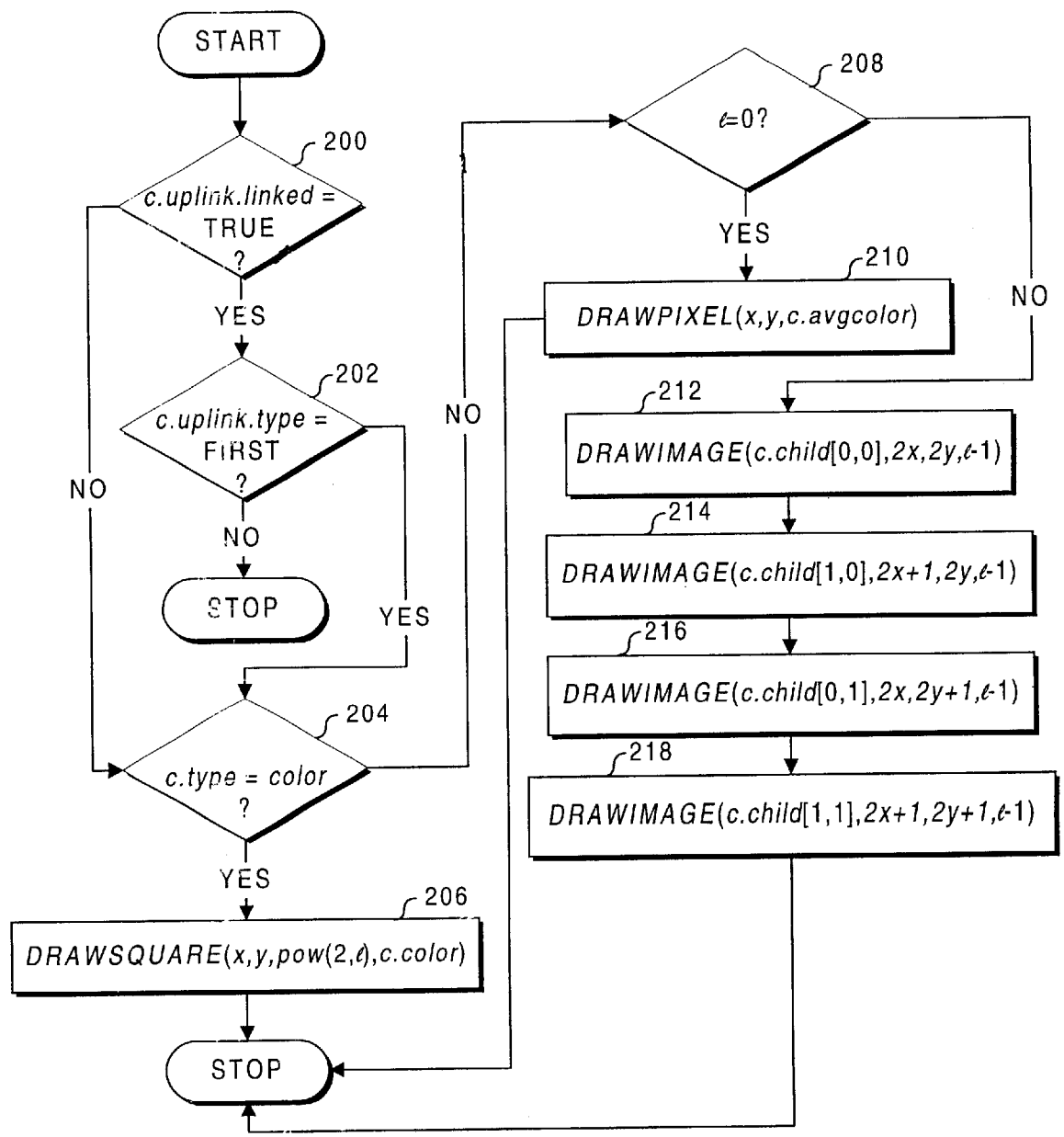
Figure 18:
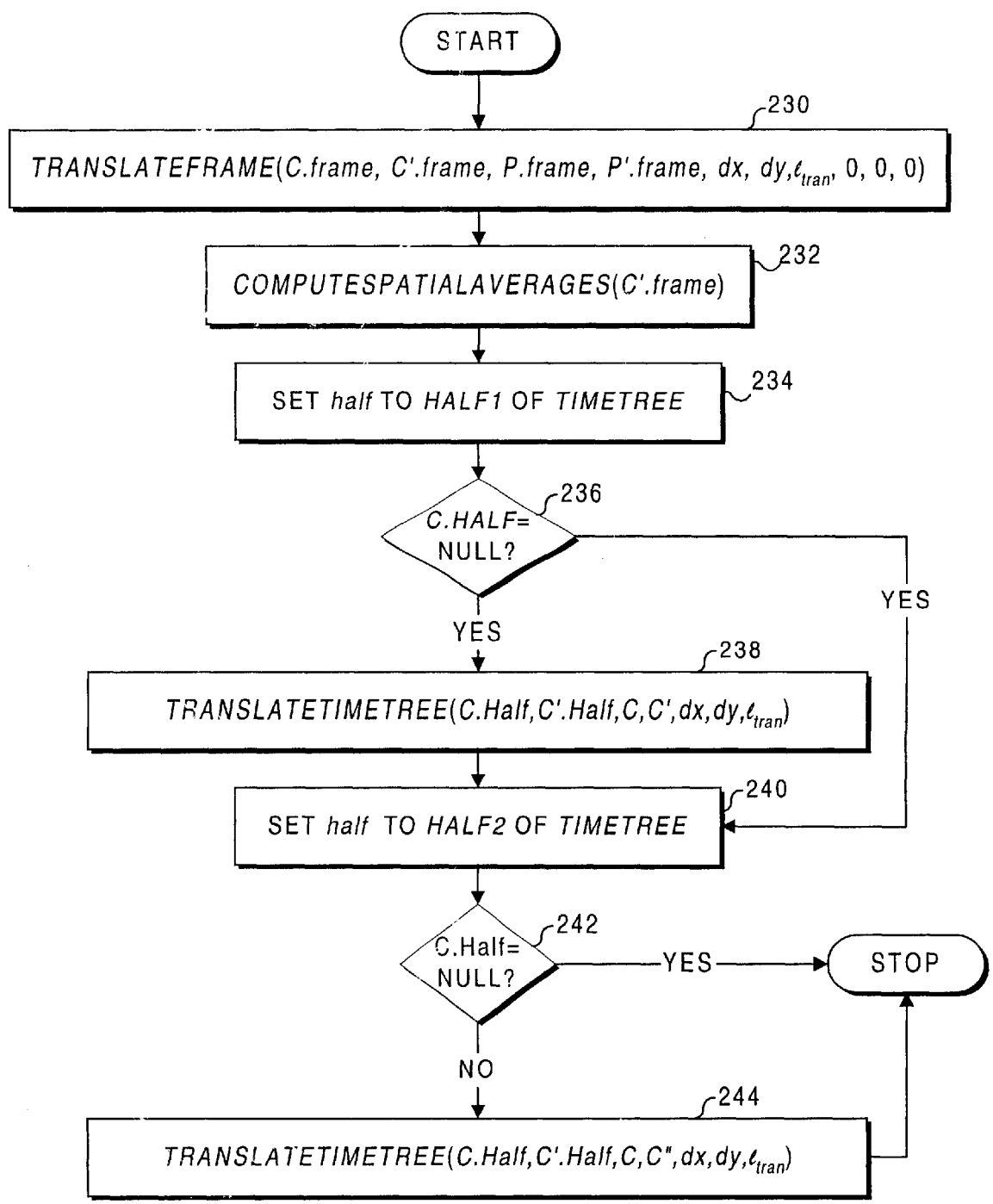
Figure 19:
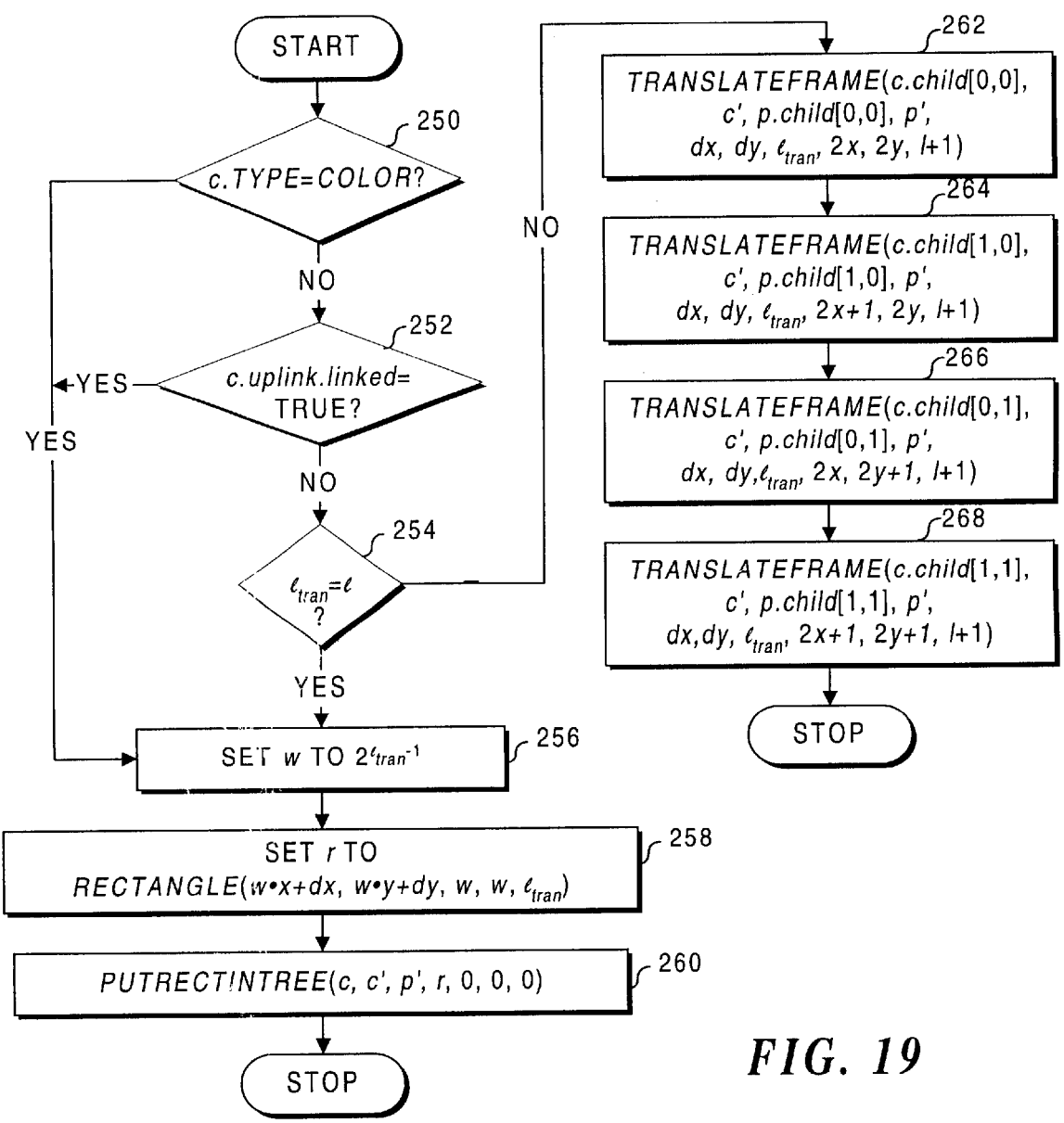
Figure 20:
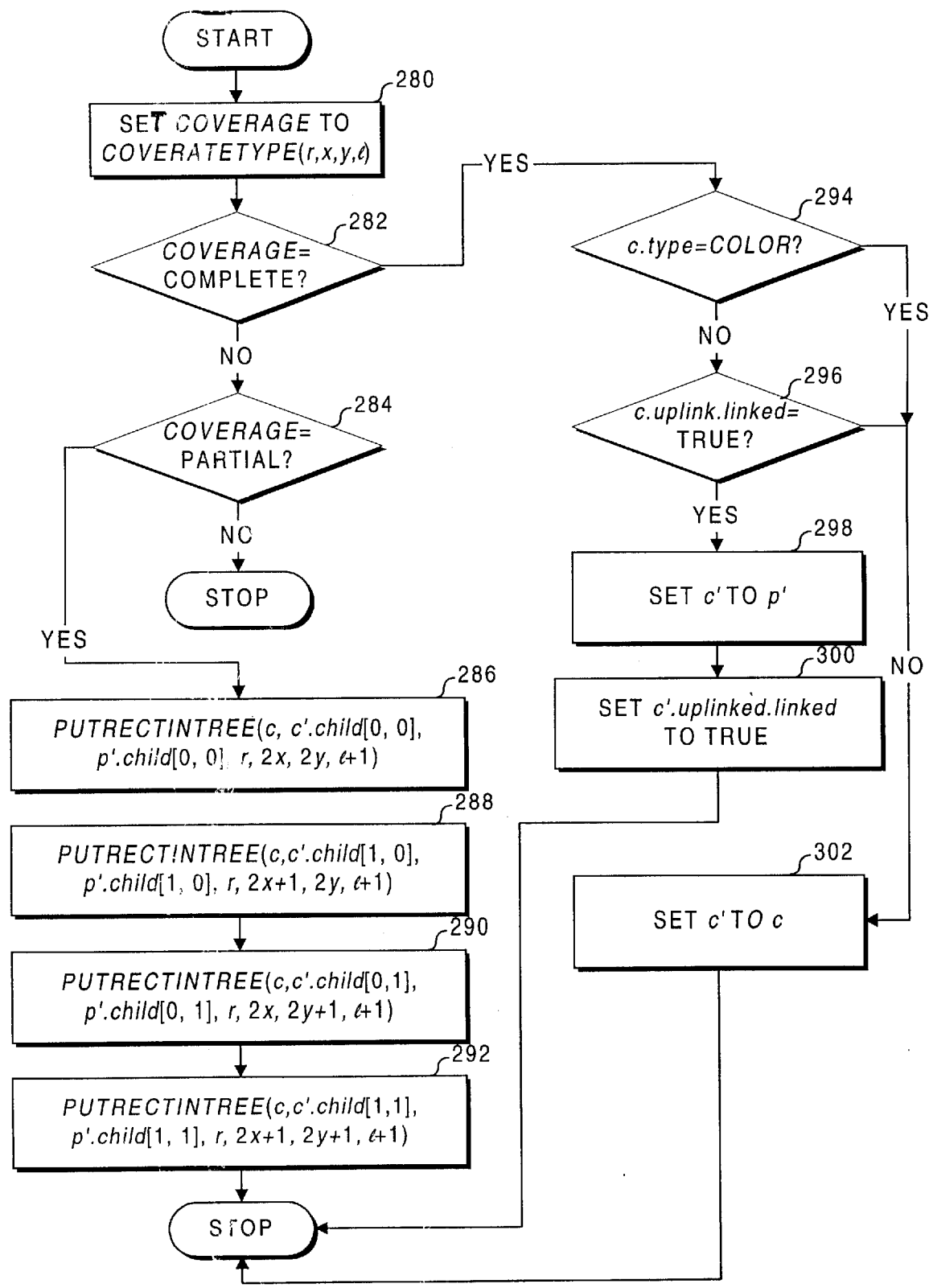
Figure 21:
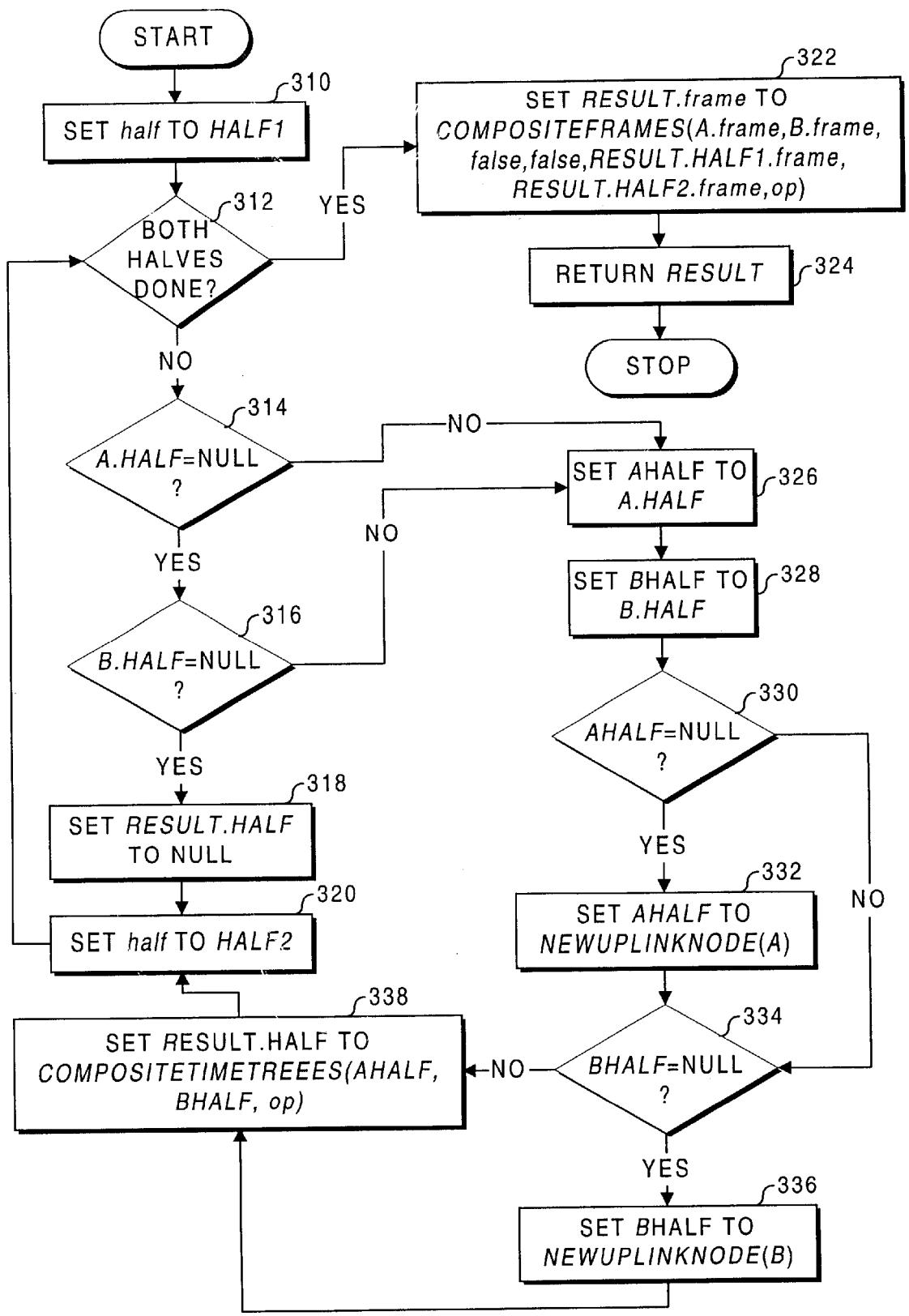
Figure 22:
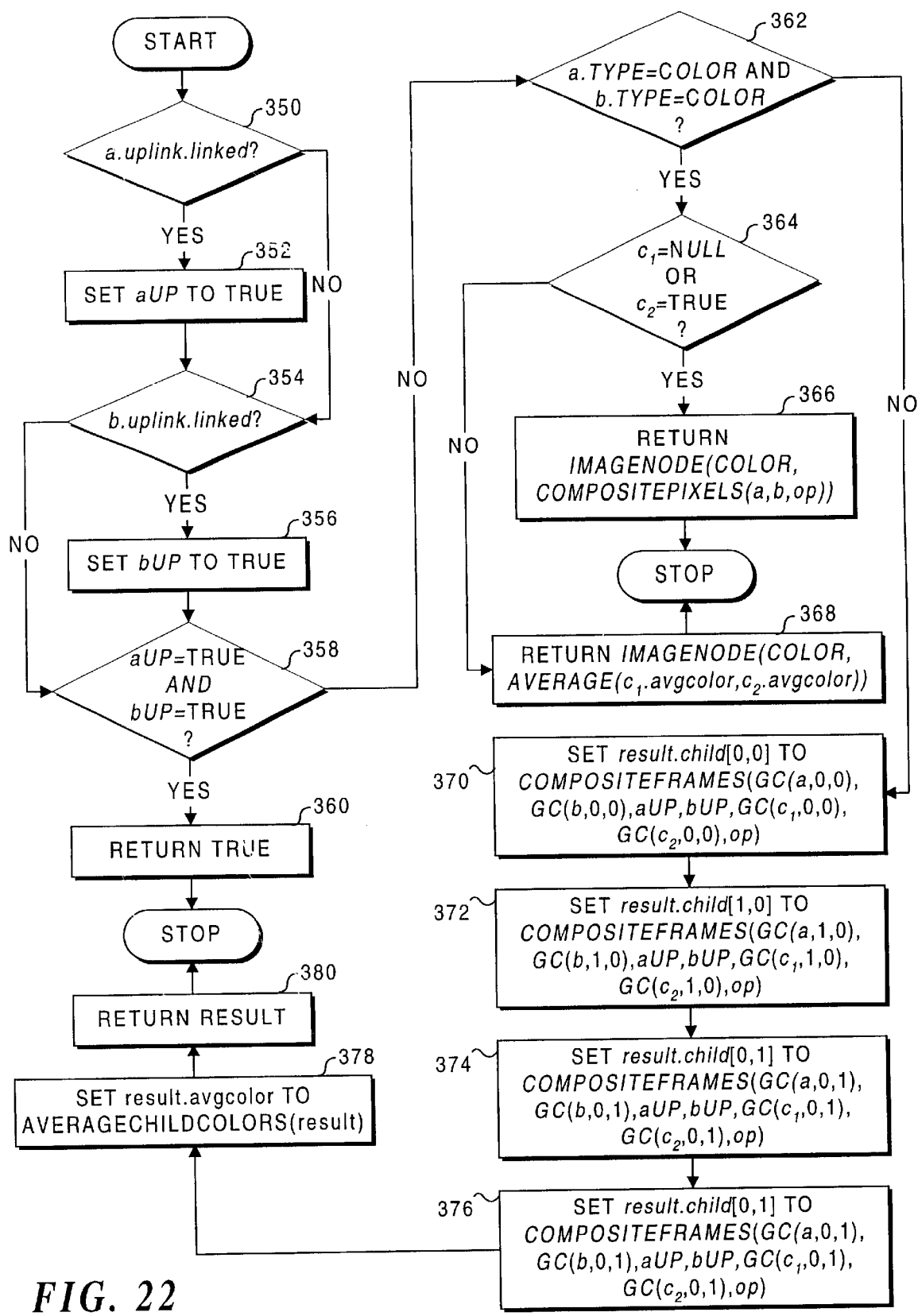
Figure 23:
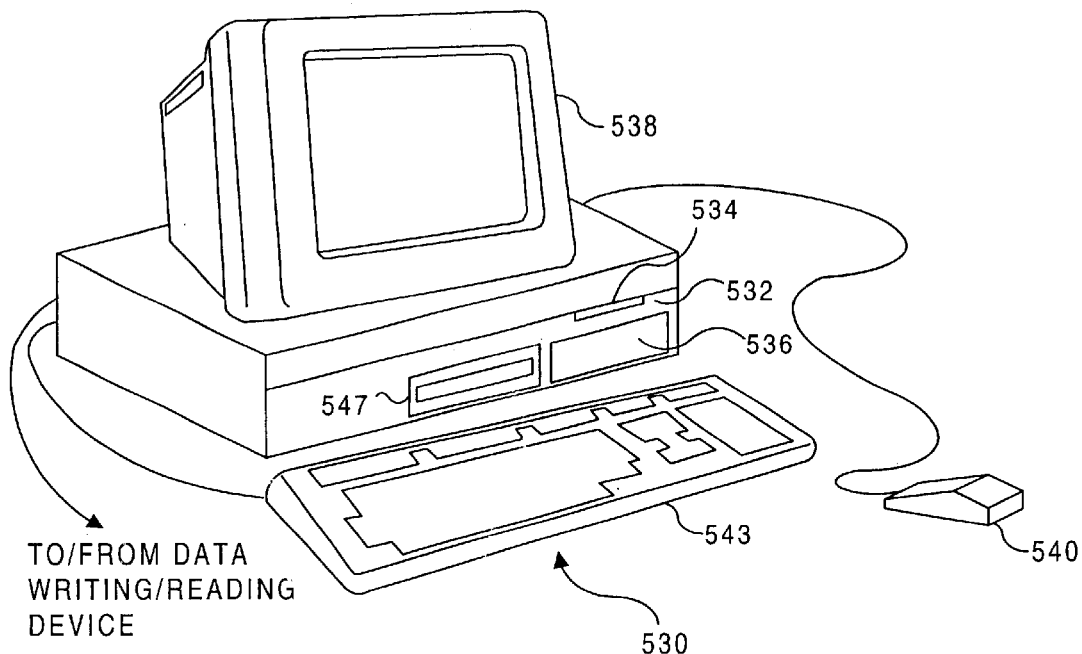
Figure 24:
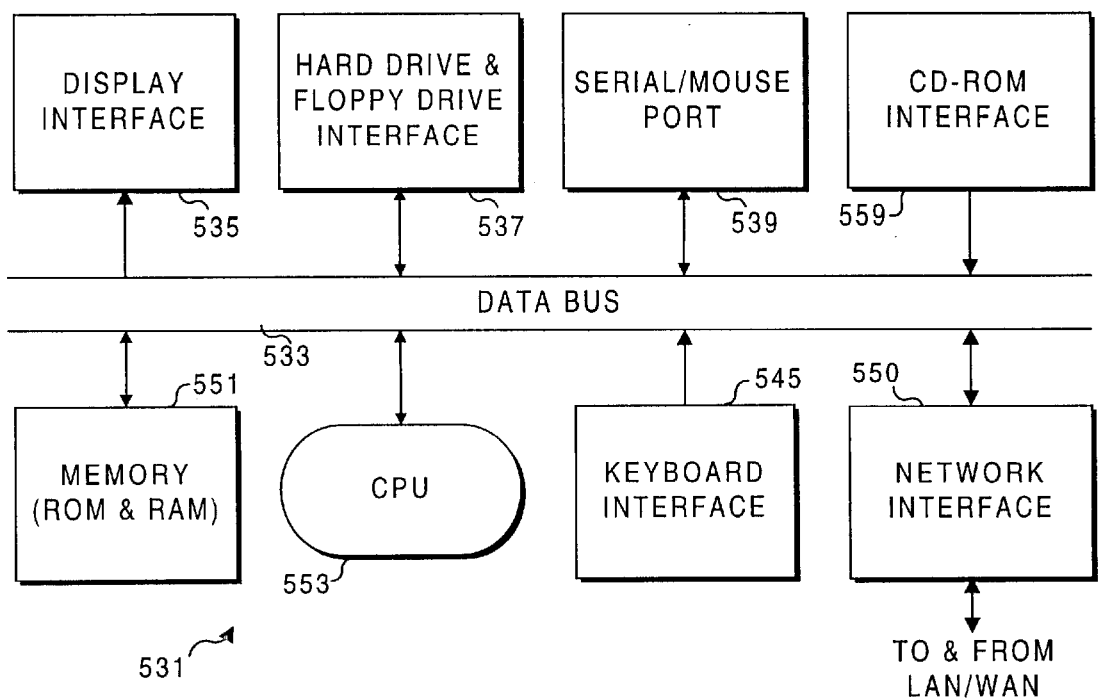

FIGS. 12A–12C respectively illustrate an exemplary panoramic multiresolution video QuickTime VR™ scene, and two more detailed views from the scene;

FIG. 13 is a flow chart illustrating the logic used for creating a frame of multiresolution video;

FIG. 14 is a flow chart illustrating the logic used for pruning a tree in the present invention;

FIG. 15 is a flow chart illustrating the logic used for making a multiresolution video;

FIG. 16 is a flow chart illustrating the logic used for making uplinks in the present invention;

FIG. 17 is a flow chart illustrating the logic used for drawing an image in the present invention;

FIG. 18 is a flow chart illustrating the logic used for translating a time tree;

FIG. 19 is a flow chart illustrating the logic used for translating a frame;

FIG. 20 is a flow chart illustrating the logic used for putting a rectangle in a tree;

FIG. 21 is a flow chart illustrating the logic used for producing composite time trees;

FIG. 22 is a flow chart illustrating the logic used for producing composite frames in accord with the present invention;

FIG. 23 is a schematic diagram of a computer system suitable for executing the present invention; and FIG. 24 is a schematic block diagram showing internal components of a processor chassis in the computer system of FIG. 23.

DESCRIPTION OF THE PREFERRED EMBODIMENT

The goals in designing a multiresolution video representation in accord with the present invention included supporting varying spatial and temporal resolutions; requiring overall storage proportional only to the detail present (with a small constant of proportionality); efficiently supporting a variety of primitive operations for creating, viewing, and editing the video; permitting lossy compression; and accomplishing the preceding goals using only a small "working storage" overhead, so that video data can be streamed in from storage on a disk or other non-volatile memory when needed.

A likely first choice for a multiresolution video format might be a sparse octree, whose three dimensions should be usable to encode two spatial directions and time. However, the sparse octree format does not adequately address a number of the goals enumerated above. The problem with the sparse octree representation is, that it couples the dimensions of space and time too tightly. In an octree structure, each node must correspond to a "cube" with a fixed extent in space and time. Thus, it would be efficient to rescale a video to, say, twice the spatial resolution only if it were equally rescaled in time—that is, played at half the speed. Since this constraint is unacceptable, it was necessary to develop a representation format that, while still making it possible to take advantage of temporal and spatial coherence, could couple space and time more loosely than the sparse octree representation permits.

The structure or format ultimately chosen for this purpose is a sparse binary tree 50 of sparse quadtrees 52, as generally shown by way of example, in FIG. 1. Binary tree 50 encodes the flow of time, and each quadtree 52 encodes the spatial decomposition of a frame. The data structure encodes multiple streams of video data that are interlinked and share a common time reference. It is also contemplated that audio data can be encoded in this structure as one of the multiple streams. If so, the audio data will be subject to the temporal resolution with which the frames of image data are displayed. As the temporal resolution is modified during playback, the audio data stream will be subject to frequency shifts corresponding to the changes of the temporal resolution from some nominal "real time" rate at which the audio data were originally created.

In the binary tree used in the present invention, which is called a Time Tree, each node 54 corresponds to a single image, or frame, of a video sequence at some temporal resolution, as indicated by a time scale 56. Leaves of the Time Tree correspond to frames at the highest temporal resolution for which information is present in a video sequence. Internal nodes of the Time Tree correspond to box-filtered averages of their two children frames. Visually, these frames appear as motion-blurred versions of their children. Note that this representation supports video sequences with varying degrees of temporal resolution simply by allowing the Time Tree to grow to different depths in different parts of the sequence. For convenience, the child nodes of the Time Tree are referred to herein and in the claims that follow as child time nodes and their parents as parent time nodes. Capitalized names are used for any time node referenced. FIG. 2A illustrates the relationship between a parent time node P and a child time node C.

Time Tree nodes are represented by the following data structure:

```
type TimeNode=record
   frame: pointer to ImageNode
   Half1, Half2: pointer to TimeNode
   end record
```

Figure 4:
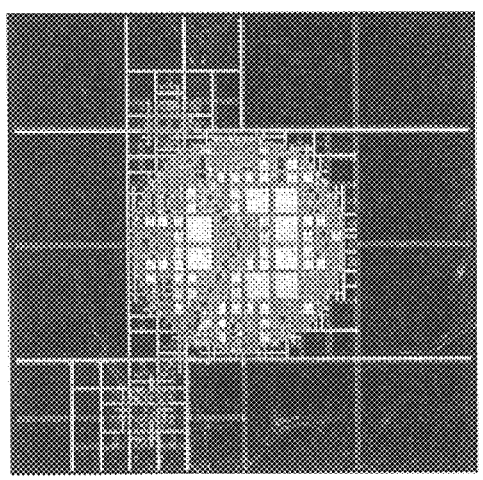
FIG. 4 is an exemplary frame from a video showing leaf nodes boxed in yellow.

Each node of the Time Tree points to a sparse quadtree, called an image tree, which represents the multiresolution image content of a single frame of the video sequence. In analogy to the Time Tree, leaves of an image tree correspond to pixels in an image frame at the highest spatial resolution for which information is present in the particular frame being represented. The internal nodes of an image tree correspond, once again, to box filtered averages of their children. For example, in the case shown in FIG. 2B, the top parent node is a box filtered averaged of a 2×2 block 58 (child) having corresponding higher resolution than the parent. Note that the image tree supports varying spatial resolution simply by allowing the quadtree to reach different depths in different parts of the frame. The child nodes (e.g., child image node 60) of an image tree are referred to herein and in the claims as child image nodes and their parents (e.g., parent image node 57) as parent image nodes. In the pseudocode presented in this description, lowercase names are used for any image node. FIG. 4 (color) shows a frame from a video clip, where leaf nodes of the image tree are defined by yellow boxes.

Specifically, each node in the image tree is encoded as:

```
type ImageNode = record
   type: TREE | COLOR
   uplink: UpLinkInfo
   union
      tree: pointer to ImageSubtree
      color: PixelRGBA
   end union
end record
type ImageSubtree = record
   avgcolor: PixelRGBA
   child[0 . . . 1, 0 . . . 1]: array of ImageNode
   end record
```

Each subtree in the image tree contains both the average color for a region of the image, stored as an RGBA pixel, and also image nodes for the four quadrants of that region. The average of the pixels is computed as if each color channel were pre-multiplied by its alpha value, but the pixels are not represented in that way in the image nodes, in order to preserve color fidelity in highly transparent regions. Each image node generally contains a pointer to a subtree for each quadrant. However, if a given quadrant only has a single pixel's worth of data, then the color of the pixel is stored in the node directly, in place of the pointer. (This trick works nicely, since an RGBA pixel value is represented in this system with four bytes, the same amount of space as a pointer. Packing the pixel information into the pointer space allows a large amount of memory to be saved that might otherwise be wasted on null pointers, at the leaves.) There is also an uplink field, whose use is discussed below.

An additional relationship between image nodes exists that is not represented explicitly in the structure, but which is nevertheless crucial to the algorithms used in the present invention. As described already, there are many different image nodes that correspond to the same region of space, each hanging from a different time node. Any two such image nodes are called time-relatives herein and in the claims that follow. In particular, for a given child image node c hanging from a child time node C, a time-relative p may be hanging from a parent time node P of C, i.e., from the time-parent of c. In this case, the image node c is also called the time-child of p. (See FIGS. 2A and 2B for an illustration of this relationship, in which a time-child 62 is hanging from child time node C, and a time-parent 64 is hanging from the parent time node.) Note that a given node does not necessarily have a time-parent or a time-child, as the quadtree structures hanging from P and C may differ.

Temporal Coherence

Recall that the representation of each frame of the multiresolution video exploits spatial coherence by pruning the image tree at nodes for which the image content is nearly constant. Advantage can be taken of temporal coherence in a similar way, even in regions that are spatially complex.

Figure 3:
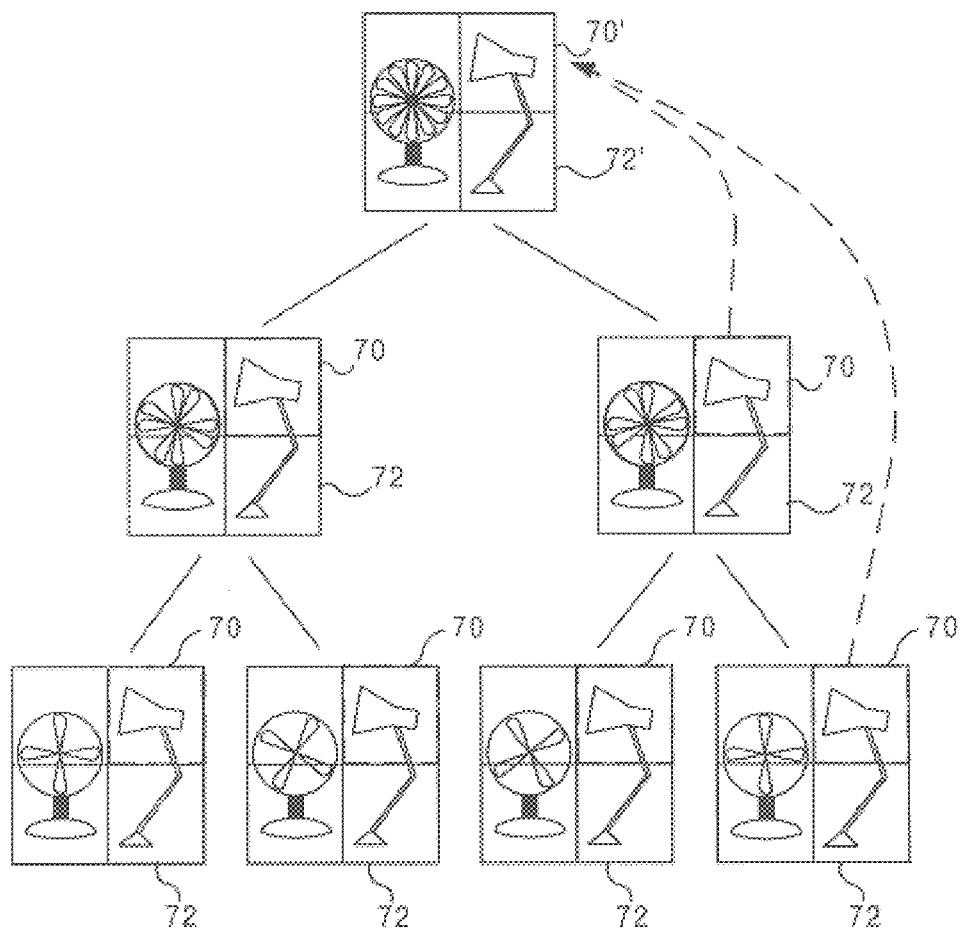
FIG. 3 is an example of a time tree in which uplinks are used in time-children for pointing to a time-parent that stores similar information.
Figure 5:
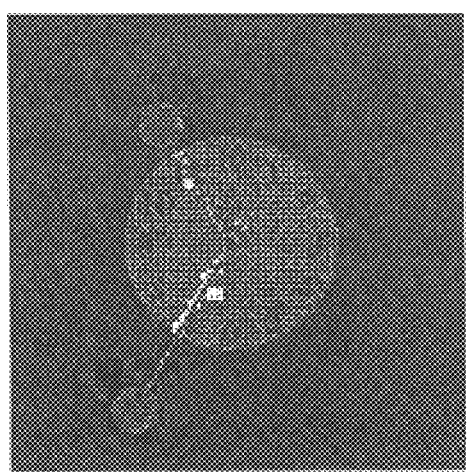
FIG. 5 is an exemplary frame from a multiresolution video in accord with the present invention, in which all uplink regions are shaded red.

Consider an image node p and its two time-children $c_1$ and $c_2$. Whenever the images in $c_1$ and $c_2$ are similar to each other, the image in p will be similar to these images as well. Rather than triplicating the pixel data in all three places, it is preferable to instead just store the image data in the time-parent p and allow $c_1$ and $c_2$ to point to this image data directly. Such pointers are referred to herein as uplinks. FIG. 3 illustrates a schematic example showing how uplinks are employed. In this example, the frame quadrants containing the "LUXO" lamp need not be replicated in the lower six frames of the Time Tree. Instead, the image data for the right two quadrants, i.e., quadrants 70 and 72, in the lower six frames are replaced with pointers (uplinks—not shown) to corresponding quadrants 70' and 72' in the root of the Time Tree. FIG. 5 shows a frame from a multiresolution video clip in which all uplink regions (which cover most of the frame) are shaded red.

The uplinks are described by the following structure.

type UpLinkInfo=record
      linked: Boolean
      type: FIRST|MIDDLE|LAST
   end record The linked field tells whether or not there is an uplink. There is also a type field, which is described in more detail in the following explanation.

Storage Complexity

Once the multiresolution video data structure is defined, its storage cost can be analyzed. The type and uplink fields of the data structure require very few bits, and in practice these two fields for all four children may be bundled together in a single four byte field in the ImageSubtree structure. Thus, each ImageSubtree contains four bytes (for the average color), 4×4 bytes (for the children), and four bytes (for the flags), yielding a total of 24 bytes. Each leaf node of an image tree comprises four pixels, and there are 4/3 as many total nodes in these trees example uplinks as there are leaves. Assuming P pixels per time node, the result is:

24 bytes/node×4 nodes/3 leaf×1 leaves/4 pixels×P pixels/time node=8P bytes/time node.

Furthermore, there are twice as many time nodes as there are leaves (or frames) in the Time Tree, so the storage complexity is really 16P bytes/frame. In addition, each TimeNode contains 3×4=12 bytes, and there are twice as many nodes in this tree as there are leaves. Thus, the Time Tree needs an additional 24 bytes/frame. However, since 16P is generally much larger than 24, the latter term can be ignored in the analysis. The overall storage is therefore 16 bytes/pixel.

In the worst case—a complete tree with no uplinks—there are as many pixels in the tree as in the original image. Thus, the tree takes four times as much storage space as required by just the highest resolution pixel information alone. It is worthwhile to compare this overhead with the cost of directly storing the data for the same set of time and space-averaged frames, without allowing any storage space for pointers or flags. Such a structure would essentially involve storing all powers-of-two time and spatial scales of each image, requiting a storage overhead of 8/3. Thus, the storage overhead of four achieved with the present invention is only slightly larger than the minimum overhead required otherwise. However, as will be described below, the set of pointers that makes the worst case storage overhead larger also permits both lossless and lossy compression by taking advantage of coherence in space and time.

Working Storage

One of the goals of the present invention is to require a small "working storage" overhead, so that video can be streamed in from storage on a disk only when needed. This feature is crucial for viewing very large sequences, as well as for the editing operations described below. As will be seen when these operations are discussed in detail, this goal is readily addressed by keeping resident in memory just the image trees that are currently being displayed or edited, along with all of their time ancestors. Thus, for a video clip with $2^k$ frames, the number of time ancestors required is at most k.

Basic Algorithms for Creating Multiresolution Video

The following explanation addresses the problem of creating a multiresolution video from a conventional uniresolution video. This process is broken into two parts: creating the individual frames, and linking them together into a multiresolution video sequence.

The first part of the problem is handled in accord with the present invention as follows. Given a $2^l \times 2^l$ source frame S, an image tree is constructed by calling the following function with arguments (S, 0, 0, l):

```
function CreateFrame(S, x, y, l): returns ImageNode
    if l = 0 then return ImageNode(COLOR, S[x, y])
    for each i, j ∈ {0, 1} do
        x' ← 2x + i
        y' ← 2y + j
        subtree.child[i, j] ← CreateFrame(S, x', y', l - 1)
    end for
    subtree.avgcolor ← AverageChildren(subtree.child[0 . . . 1, 0 . . . 1])
    return ImageNode(TREE, subtree)
end function
```

The steps of this process are illustrated in FIG. 13. A decision block 100 determines if l is equal to zero, and if so, returns ImageNode, which is a function of the color and the position of the image frame. This process then terminates. If a negative response is returned from decision block 100, the logic in a block 104 sets a variable xNEW to 2x and a variable yNEW to 2y. A block 106 provides for setting subtree.child[0,0] to the function CreateFrames(S, xNew, yNew, l–1), which creates a frame with the designated parameters. In a block 108, the values of xNEW and yNEW are set to 2x and 2y+1, respectively. The CreateFrame function is again called to set subtree.child[0,1] for the parameters S, xNEW, yNEW, and l–1, in a block 110. In an analogous fashion, the CreateFrame frame function is called to set subtree.child for [1,0] and [1,1] in blocks 114 and 118, and for the values of xNEW and yNEW set in blocks 112 and 116. A block 120 sets subtree.avgcolor to the average of all the child colors as defined by subtree.child[0 . . . 1, 0 . . . 1]. A block 122 provides for returning ImageNode(tree, subtree). Image trees built from images that are not of dimension 2l×2l are implicitly padded with transparent, black pixels.

The quadtree constructed by CreateFrame( ) is complete. The next step is to take advantage of spatial coherence by culling redundant information from the tree. The following function recursively traverses the image tree p and prunes any subtree whose colors differ from its average color a by less than a threshold δ:

```
function PruneTree(p, a, ( ): returns Boolean
    if p.type = COLOR then return (ColorDiff(p.color, a) ≦ ()
    prune ← TRUE
    for each i, j ∈ {0, 1} do
        prune ← prune and PruneTree(p.child[i, j], p.avgcolor, ( )
    end for
    if prune = FALSE then return FALSE
    free(p.child[0 . . . 1, 0 . . . 1])
    p ← ImageNode(COLOR, p.avgcolor)
    return TRUE
end function
```

FIG. 14 shows the logic implemented by the above pseudocode. A decision block 130 determines if p.type is equal to the variable color. If so, a decision block 132 provides for determining if the value of ColorDiff(p.color, a) is less than or equal to δ. If so, in accord with a block 134, the logic returns a Boolean value true. Otherwise, a block 136 provides for returning a Boolean value false. Following block 134 or 136, the logic terminates.

A negative response to decision block 130 leads to a block 138 that sets Prune to PruneTree for the parameters p.child[0 . . . 1, 0 . . . 1], p.avgcolor, and δ. A decision block 140 determines if Prune is false, and if so, proceeds to block 136 to return the Boolean false value. If not, a block 142 provides for freeing all of the children p.child[0 . . . 1, 0 . . . 1]. In a block 144, the value of p is set to ImageNode (color, p.avgcolor). A block 146 then returns a Boolean true value before the process terminates.

Choosing δ=0 yields lossless compression, whereas using δ>0 permits an arbitrary degree of lossy compression at the expense of image degradation. The function ColorDiff( ) measures the distance between two colors $(r_1, g_1, b_1, a_1)$ and $(r_2, g_2, b_2, a_2)$. The preferred embodiment of the present invention measures the distance as the sum of the distances between color components, weighted by their luminance values, i.e., as:

$$0.299|r_1a_1-r_2a_2|+0.587|g_1a_1-g_2a_2|+0.114|b_1a_1-b_2a_2|.$$

In practice, the source material may be multiresolution in nature. For example, the results of some of the scientific simulations described below were produced via adaptive refinement. It is easy to modify the function CreateFrame( ) to sample source material at different levels of detail in different parts of a frame. In this case, the recursive function descends to varying depths, depending on the amount of detail present in the source material.

The next step is to link all the frames together into the Time Tree. First, all the image trees are inserted at the leaves of the Time Tree, and then all of the internal nodes are computed by averaging pairs of frames in a depth-first recursion. Now that the complete Time Tree is built, the following two procedures discover and create all the uplinks:

```
procedure MakeMRVideo(Timetree, ( ):
    for each Half ∈ {Half1, Half2} of Timetree do
        if Half ≠ NULL then
            MakeUpLinks(Half.frame, Timetree.frame, ( )
            MakeMRVideo(Half, ( )
        end if
    end for
end procedure
function MakeUpLinks(p, c, ( ): returns Boolean
    c.uplink.linked ← FALSE
    if p = NULL or p.type ≠ c.type then
        return FALSE
    else if c.type = COLOR then
        c.uplink.linked ← (ColorDiff(p.color, c.color) ≦ ( )
        return c.uplink.linked
    end if
    link ← TRUE
    for each i, j ∈ {0, 1} do
        link ← (link and MakeUpLinks(p.child[i, j], c.child[i, j]), ( )
    end for
    if link = FALSE then return FALSE
    free(c.tree)
    c.tree ← p.tree
    c.uplink.linked ← TRUE
    return TRUE
end function
```

The logic for the first part of this procedure is shown in FIG. 15. In a block 150, the variable half is set to half1 of timetree. A decision block 152 then determines if this variable is null, and if not, a block 154 provides for calling the function MakeUpLinks(half.frame, timetree.frame, ( ). In a block 156, the routine MakeMRVideo(half, ( ) is called. Following block 156 or if the response to decision block 152 is in the affirmative, a block 158 provides for setting half to half2 of timetree. A decision block 160 determines if the new value of the variable half is true, and if so, the process terminates. Otherwise, a block 162 calls the function MakeUpLinks( ) with the same parameters as in block 154. Similarly, a block 164 calls the routine MakeMRVideo( ) with the same parameters as in block 156, and the process terminates.

The MakeMRVideo( ) routine works by finding all of the uplinks between the root of the Time Tree and its two child time nodes. The routine then calls itself recursively to find uplinks between these children and their descendents in time. Because of the preorder recursion, uplinks may actually point to any time-ancestor, not just a time-parent, as shown in FIG. 3.

With reference to FIG. 16. the steps employed in the second part of the process are illustrated. A block 170 provides for setting the variable c.uplink.uplinked to false. A decision block 172 determines if the variable p is null, and if so, proceeds to a block 174, in which a Boolean false value is returned. The logic then terminates the process. Otherwise, a decision block 176 determines if the p.type is equal to the c.type, and if not proceeds to block 174. An affirmative response leads to a decision block 178, which determines if c is a color node, and if so, the logic advances to a decision block 180. In decision block 180, the difference between p.color and c.color is compared to δ. If the difference is not less than or equal to δ, a block 182 sets c.uplink.linked to false. The process then continues with block 174. An affirmative response to decision block 180 leads to a block 192, which provides for setting c.uplink.linked to true. A block 194 then returns a Boolean true value and the process terminates.

A negative response to decision block 178 leads to a block 184 in which the variable Link is set to the function MakeUpLink( ), with the parameters p.child[0 . . . 1, 0 . . . 1], c.child[0 . . . 1, 0 . . . 1], and δ. A decision block 186 determines if Link is equal to a Boolean false value, and if so, proceeds to block 174. Otherwise, a block 188 frees c.tree. A block 190 then sets c.tree to p.tree. The logic then proceeds with block 192, as described above.

The MakeUpLinks( ) function attempts to create an uplink from a time-child c to its time-parent p. An uplink is created if the two nodes are both subtrees with identical structure, and all of their descendent nodes are sufficiently close in color. The function returns TRUE if such an uplink is created. It also returns TRUE if the two nodes are colors and the two colors are sufficiently close, i.e., if the difference is less than or equal to δ; it furthermore sets the child node's uplink flag, which is used to optimize the display operation in a subsequent procedure.

After executing MakeMRVideo( ), the entire Time Tree is traversed in a separate pass that sets the type field of the uplink structure, whose use is explained in the following section.

Display

Drawing a frame at an arbitrary power-of-two spatial or temporal resolution is relatively straightforward. Displaying at a particular temporal resolution involves drawing frames at the corresponding level in the Time Tree. Similarly, displaying at a particular spatial resolution involves drawing the pixels situated at the corresponding level in the image trees.

The uplinks that were used above to optimize storage can also play a role in optimizing the performance of the display routine when playing successive frames. It is preferable to avoid refreshing any portion of a frame that is not changing in time; the uplinks provide exactly the information needed for that purpose. In particular, if frame t has just been displayed, then it is not necessary to render portions of frame t+1 (at the same time level) that share the same uplinks. The type field in the UpLinkInfo structure is used to specify the first and last uplinks of a sequence of frames that all share the same parent data. When playing video forward, it is not necessary to render any region that is pointed to by an uplink, unless it is a FIRST uplink. Conversely, if the video is playing backward, it is only necessary to render the LAST uplinks.

To render the image content c of a single multiresolution video frame at a spatial resolution $2^l \times 2^l$, the following recursive routine is called, and it is passed the root c of an image tree and other parameters (0, 0, l):

```
procedure DrawImage(c, x, y, l):
    if c.uplink.linked and c.uplink.type ≠ FIRST then return
    if c.type = COLOR then
        DrawSquare(x, y, 2^l, c.color)
    else if l = 0 then
        DrawPixel(x, y, c.avgcolor)
    Else
        for each i, j ∈ {0, 1} do
            DrawImage(c.child[i, j], 2x + i, 2y + j, l - 1)
        end for
    end if
end procedure
```

In FIG. 17, a decision block 200 determines if the variable c.uplink.linked is equal to a Boolean true, and if so, a decision block 202 determines if the variable c.uplink.type is equal to FIRST. A negative response to either decision blocks 200 or 202 leads to a decision block 204, which determines if c.type is equal to a color value. If so, a block 206 calls the DrawSquare outline, with the parameters x, y, pow(2, l), and c.color. The process then terminates and returns to the main program.

A negative response to decision block 204 leads to a decision block 208, which determines if l=0. If so, the DrawPixel routine is called, using the parameters x, y, and c.avgcolor, as shown in block 210. The process then terminates. Otherwise, from decision block 208, the logic proceeds with a block 212. In this block and in successive blocks 214, 216, and 218, the DrawImage routine is called with appropriate parameters c.child[0 . . . 1, 0 . . . 1], 2x+0 . . . 1, 2y+0 . . . 1, and l−1. The routine then terminates after block 218, returning to the main program.

The routine DrawSquare( ) renders a square at a given location and size in the application window, while DrawPixel( ) renders a single pixel. Note that DrawImage( ) assumes that the video is being played in the forward direction from beginning to end. A routine to play the video in reverse should use LAST in place of FIRST in the first line. A routine to display a single frame that does not immediately follow the previously displayed frame (for example, the first frame to be played) should omit the first line of code in the above routine.

One further optimization employed is to actually keep track of the bounding box of nontransparent pixels in each frame. This bounding box is intersected with a rectangle containing the visible portion of the frame on the screen, and only this intersection is drawn. Thus, if only a small portion of the frame is visible, only that portion is drawn. The DrawImage( ) routine requires an execution time proportional to the number of squares that are being drawn, assuming that the time to draw a square is constant.

Fractional-level Zoom

The DrawImage( ) routine as described above displays a multiresolution video at any power-of-two spatial resolution. A simple method known in the prior art can be employed to allow users to view multiresolution images at any arbitrary scale. This known method has been adapted to work for multiresolution video. The basic concept is that if a frame of video is to be displayed at a fractional level between integer levels l−1 and l, pixels are selected from the image tree as though drawing a $2^l \times 2^l$ image, and then those pixels are displayed at locations appropriate to the fractional level. So, if a pixel would be drawn at location (x, y) in a $2^l \times 2^l$ image, then it will be drawn at location (x', y') in an M×M image, where:

x'=[xM/$2^l$] and y'=[yM/$2^l$].

Furthermore, the method interpolates between the colors appearing at levels l and l−1 in the image tree in order to reduce point-sampling artifacts. Drawing at this fractional level is only slightly more expansive than drawing pixels at level l.

Similarly, even though frames are selected from the Time Tree corresponding to power-of-two intervals of time, "fractional rates" can be achieved through the video, as will be described below.

Applications of the Present Invention

Several applications of the primitive operations presented in the last section are described in this section. These applications include multiresolution playback, with motion-blurred "fast-forward" and "reverse;" constant perceived-speed playback; enhanced video shuttling or searching; "video clip-art" editing and compositing; and "multiresolution video QuickTime VR™." These applications of multiresolution video serve as "tools" that can be assembled in various combinations into higher-level applications.

Multiresolution Playback

The primary application of multiresolution video is to support playback at different temporal and spatial resolutions. To play a video clip at any temporal resolution $2^k$ and spatial resolution $2^l \times 2^l$, successive calls are made to the procedure DrawImage( ), passing it a series of nodes from level k of the Time Tree, as well as the spatial level l. It is possible to zoom in or out of the video by changing the level l, which changes the spatial resolution.

Similarly, for "motion-blurred" fast-forward and reverse, a smaller time level k is used. In the preferred implementation, the motion-blur effect comes from simple box filtering of adjacent frames. Though box filtering may not be ideal for creating high quality animations, it does appear to be adequate for searching through video.

Sometimes it may be desirable to have a limited degree of motion blur, which might, for example, blur the action in just the first half of the frame's time interval. This kind of limited motion blur can be implemented by descending one level deeper in the Time Tree, displaying the first child time node rather than the fully motion-blurred frame.

Constant Perceived-speed Playback

During video playback, it is useful to be able to maintain a constant perceived speed, despite variations in the network throughput or CPU availability. Multiresolution video provides two ways of adjusting the speed of play, which can be used to compensate for any such variations in load. First, by rendering individual frames at a finer or coarser spatial resolution, the application can adjust the rendering time up or down. Second, by moving to higher or lower levels in the Time Tree, the application can also adjust the perceived rate at which each rendered frame advances through the video.

These two mechanisms can be traded off in order to achieve a constant perceived speed. One possibility is to simply adjust the spatial resolution to maintain a sufficiently high frame rate, say 30 frames/second. If, however, at some point the degradation in spatial resolution becomes too objectionable (for instance, on account of a large reduction in network bandwidth), then the application can drop to a lower frame rate, say, 15 frames/second, and at the same time move to the next higher level of motion-blurred frames in the Time Tree. At this lower frame rate, the application has the liberty to render more spatial detail, albeit at the cost of more blurred temporal detail. Similarly, if the processing load or demand on the processor controlling the display of the video data becomes too great, the processor can dynamically control either (or both) of the temporal and spatial resolution with which the video data are being displayed, so that as the load increases to the limit on the processor, it proportionally scales back on the resolution of the displayed video data.

It should also be noted that a user has the ability using the present invention to encode the video data to arbitrarily high levels of either or both spatial resolution. As noted above, there are instances in which relatively high resolution is required in portions of video data, particularly for video data that records technical or events, such as the movement of a humming bird's wings, while the approach of the humming bird to a flower can be recorded at substantially lower levels of resolution, without loss of substantive information. The ability to choose the desired level of resolution with which the video data are encoded—both spatial and temporal, is a key feature of the present invention.

Note that by alternating between the display of frames at two adjacent levels in the Time Tree, play of the data can be accomplished at arbitrary speeds, not just those related by powers of two.

Shuttling or Searching Through Video

Conventional broadcast quality video editing systems allow a user to search through a video interactively by using a slider or a knob, in a process known as "shuttling." In such systems, frames are simply dropped to achieve faster speeds through the video.

Multiresolution video supports a new kind of shuttling or searching that shows all of the motion-blurred video as the user searches through it, rather than dropping frames. In the implementation of the preferred embodiment of the present invention, the user interface includes a slider (not shown) whose position corresponds to a position in the video sequence. As the user moves the slider, frames from the video are displayed. The temporal resolution of these frames is related to the speed at which the slider is pulled, i.e., if the slider is moved slowly, frames of high temporal detail are displayed; if the slider is moved quickly, blurred frames are displayed, so that the user can determine the temporal resolution with which the frames are displayed during the search.

The benefits of this approach are similar to those of the constant perceived speed playback mechanism described above. If the slider is pulled quickly, then the application does not have an opportunity to display many frames; instead, it can use the motion-blurred frames, which move faster through the video sequence. In addition, the motion blur may provide a useful visual cue to the speed at which the video is being viewed.

Clip-art

In the multiresolution video editor provided in a preferred embodiment of the present invention, the user may load video fragments, scale them, arrange them spatially with respect to each other, and preview how they will look together. These input fragments may be thought of as "video clip-art" in the sense that the user constructs the final product or video composition as a composite of these elements.

Since the final composition can take a long time to construct, the application provides a preview mode, which shows roughly how the final product will appear. This preview may differ from the final composite in that Lo produce the preview, the application performs compositing on the images currently being displayed rather than on the underlying video, which is potentially represented at a much higher resolution. (The degree to which the preview differs from the final composite corresponds exactly to the degree to which the "compositing assumption" is violated.) When viewing the motion-blurred result of compositing two video sequences, there is a similar difference between the preview provided by the editor and the actual result of the compositing operation.

Once the desired effect is achieved, the user can press a button (not shown) in the interface that translates, scales, and composites the various clip-art elements into a single multiresolution video, employing the operations described below. This video may be saved for subsequent viewing, or it may be combined with other elements as clip-art to form an even more elaborate multiresolution video.

Multiresolution Video QuickTime VR

Apple Computer Corporation's QuickTime VR™ (QTVR) allows a user to explore an environment by looking from a fixed camera position out into a virtual world in any direction. In the prior art, it has been suggested that QTVR might be augmented based on quadtrees to provide two benefits. First, the quadtree augmentation would allow users to zoom into areas where there is more detail than in other areas. Second, it would reduce aliasing when the user zooms out. This concept is implemented in the preferred embodiment of the present invention and extended into the time dimension as well. Two simple modifications to multiresolution video were all that were required to achieve this "multiresolution video QuickTime VR" (MRVQTVR). First, the video frames are treated as panoramic images, periodic in the x direction. Second, the displayed frames are warped into cylindrical projections based on the view direction.

Results

Figure 6:
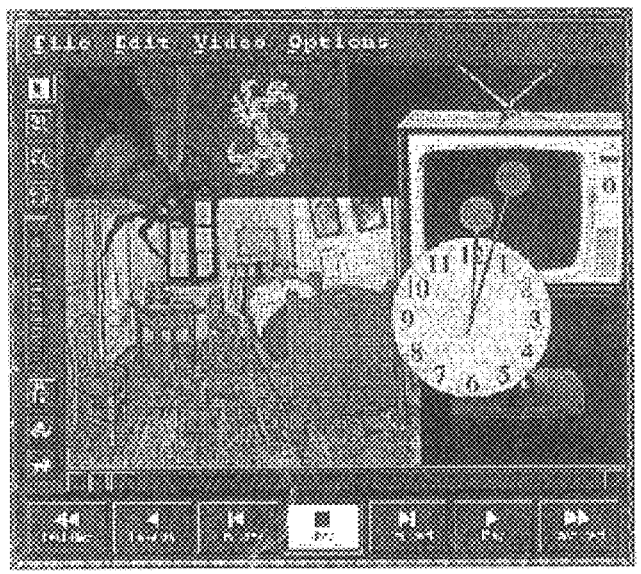
FIG. 6 illustrates an exemplary frame displayed in an application program that facilitates user interaction in creating editing, and playing a multiresolution video.

All of the operations of the previous section are part of a single prototype multiresolution video editing and viewing application. An exemplary frame composited with the application is shown in FIG. 6. With the application, a user can zoom in and out of a video either spatially or temporally, pan across a scene, grab different video clips and move them around with respect to each other, play forward or backward, and use several sliders and dials to adjust the zoom factor, the speed of play through the video, the desired frame rate, and the current position in time.

Figure 9A:
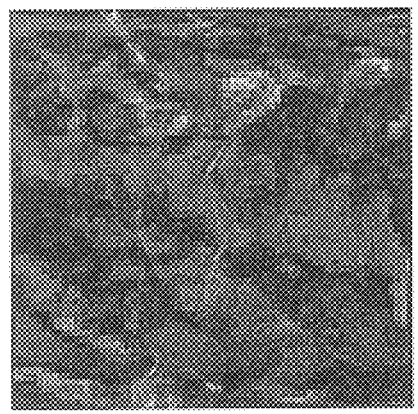
FIGS. 9A and 9B illustrate wind stress over the Pacific Ocean recorded as a multiresolution video, respectively showing a single day of 2000 days of data, and a root time node that reflects an average of the wind stress.
Figure 9B:
Figure 7A:
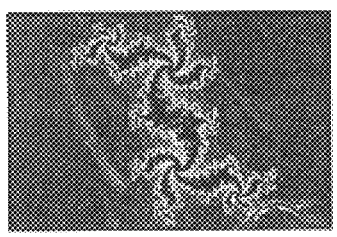
FIGS. 7A–7E illustrate an exemplary sequence of frames from the Julia set, where
Figure 8A:
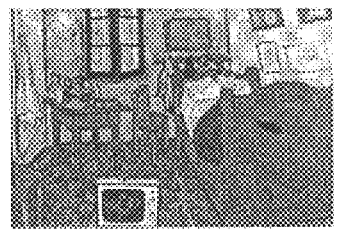
FIGS. 8A–8E illustrate an exemplary sequence of frames in which a multitude of clip art elements are arranged and composited in accord with the present invention.
Figure 7B:
Figure 8B:
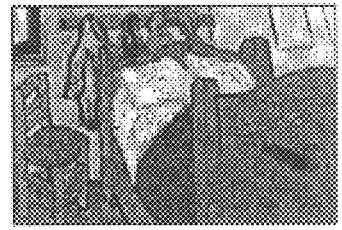
Figure 7C:
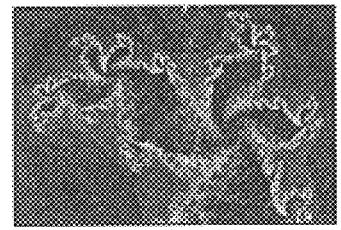
Figure 8C:
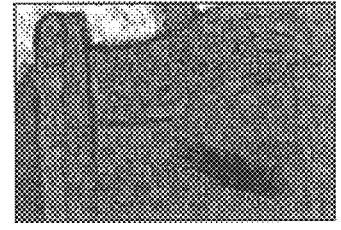
Figure 7D:
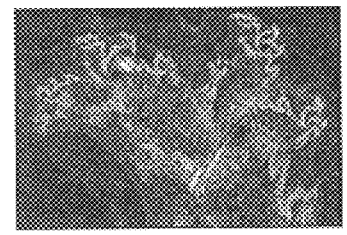
Figure 8D:
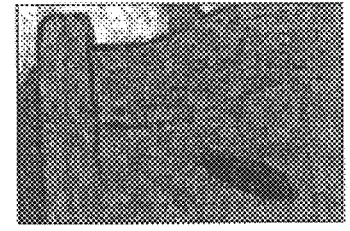
Figure 7E:
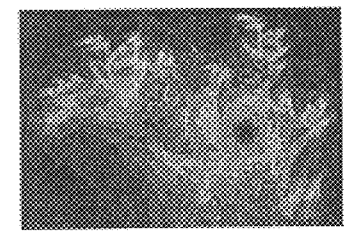
Figure 8E:
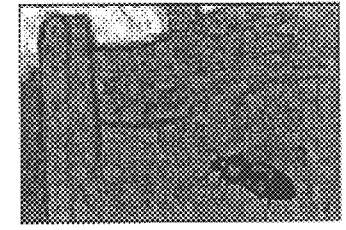

FIGS. 7A–7E illustrate how multiresolution video can be used for visualization of multiresolution data, in this case, an animation of the Julia set. The data were generated procedurally, with higher spatial resolution in places of higher detail, as described above. FIGS. 7A–7C show increasing spatial detail, and FIGS. 7D and 7E show increasing "motion blur." FIGS. 8A–8E show the result of arranging and compositing the many "clip-art" elements from the work area of the application included in FIG. 6 into a single multiresolution video, and then viewing this video at different spatial and temporal resolutions. FIGS. 9A and 9B show wind stress, the force exerted by wind over the earth's surface, measured for 2000 days over the Pacific Ocean by the National Oceanographic and Atmospheric Administration (NOAA). Wind stress is a vector quantity, which was encoded in multiresolution video using hue for direction and value for magnitude. FIG. 9A shows a leaf time node (reflecting a single day's measurements), while FIG. 9B shows the root time node (reflecting the average wind stress over the 2000-day period). Note the emergence of the dark continents in FIG. 9B, which reveals the generally smaller magnitude of wind stress over land.

Figure 10A:
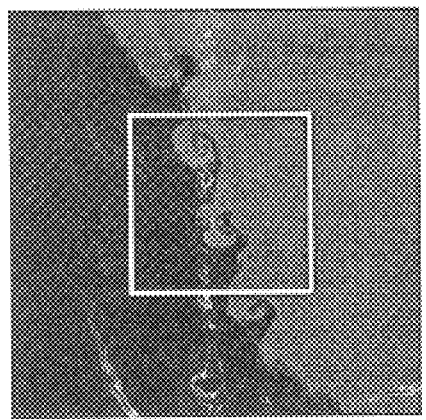
FIGS. 10A and 10B are two frames from a multiresolution video showing fluid dynamics, the second frame showing detail within the boxed area of the first frame.
Figure 10B:

FIG. 10A shows a frame from a computational fluid dynamics simulation in which two fluids (one heavy, one light) interact in a closed tank. The simulation method adaptively refines its sample grid in regions where the function is spatially complex, so the resolution of the data is higher at the interface between the two fluids than it is in the large, constant regions containing just one fluid. This refinement also occurs in time, providing higher temporal resolution in areas that are changing rapidly. FIG. 10B shows a close-up of the boxed region in FIG. 10A.

Figure 11A:
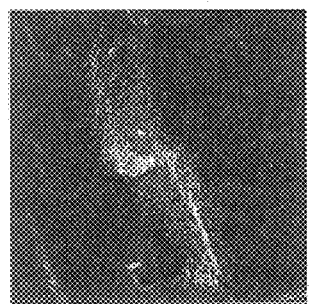
FIGS. 11A and 11B are two frames from a multiresolution science simulation.
Figure 11B:
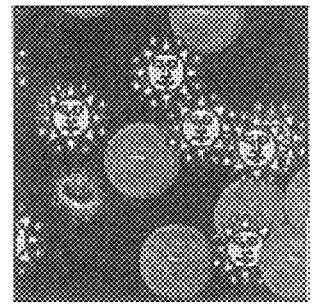

One more scientific visualization is shown in FIGS. 11A and 11B. In this simulation, a galaxy is swept about a cluster of other astronomical bodies and is eventually ripped apart by their gravitational forces. FIG. 11A shows a close-up—late in the entire simulation—focused on the galaxy. FIG. 11B shows an even closer view of a single frame in which some whimsical high resolution detail has been added. (However, creating the entire video sequence at this level of detail would be prohibitively expensive.) Finally, FIGS. 12A–12C show a QTVR panoramic image that has been adapted for use with multiresolution video QuickTime VR. The picture frame on the wall, which is shown in increasing resolution in FIGS. 12B and 12C, has been composited over the entire Van Gogh room video from FIG. 8A.

Storage Requirements

Table 1 reports information about the storage space for the examples in FIGS. 7–12. The "Disk Size" column gives the total amount of space required to store the entire structure on disk, with averages and pointers included, after it has been compressed without loss using a LempelZiv compressor [20]. The next column, "Memory Size" gives the total space required in memory, including all averages, pointers, and flags. The "Unires Size" column reports the total space that would be required to store the raw RGBA pixel values, assuming the entire video had been expanded to its highest spatial and temporal resolution present anywhere in the multiresolution video, but not including spatial or temporal averages. With the exception of the wind stress data, all of the video clips were smaller (in several cases much, much smaller) in the multiresolution video format than they would be in a uniresolution format, despite the overhead of the spatial and temporal averages. The wind stress data was difficult to consolidate because it has very little spatial or temporal coherence. The galaxy data compressed very well on disk because all of the colors stored in our structure (most of which were black) were selected from a small palette of very few colors.

TABLE 1

Sizes (in Kb) of some exemplary multiresolution video clips.

| FIGURE | Video | Disk Size | Memory Size | Unires Size |
|---|---|---|---|---|
| 7 | Julia set | 23,049 | 58,926 | 67,109 |
| 8 | Van Gogh | 46,738 | 98,798 | 34,359,730 |
| 9 | Wind stress | 68,566 | 134,201 | 33,554 |
| 10 | Fluids | 40,091 | 106,745 | 536,870 |
| 11 | Galaxy | 37,222 | 315,098 | 137,438,953 |
| 12 | Panorama | 47,723 | 100,804 | 2,199,023,256 |

User Interface Paradigms

As in previous multiresolution image work, there is an important user interface issue to be addressed. How does the user know when there is greater spatial or temporal detail present in some part of the video? One way to alert the user would be to change the appearance of the cursor in areas where there is more spatial detail present than is currently being displayed. A timeline showing a graph of the amount of temporal detail present in different parts of the video can be employed to address the corresponding temporal problem.

Environment Mapping

Multiresolution video can be used for environment maps that change in time, allowing, for example, the rendering of a crystal glass, with animated objects in the environment reflecting in the glass. One benefit of using a multiresolution representation for this purpose is that as the viewpoint and curvature of the glass surface vary, an accurate rendering may require more or less information from the surrounding environment.

Better Compression

Currently, in the present invention, the uplinks point to a time-ancestor. The requirement is imposed primarily because coherence is fairly easy to discover if this restriction is followed. However, by relaxing the restriction—that is, by allowing uplinks to point to any other place in the structure—it may be possible to achieve much better compression, particularly for areas that have spatially repeating patterns. Unfortunately, finding the optimal set of uplinks in this more general setting could be very expensive in terms of computational overhead and time.

Spatial and Temporal Anti-aliasing

Only box basis functions are employed to represent the colors in a multiresolution video in accord with the present invention. However, when a user zooms in to view a region at a higher spatial resolution than is provided in the frame, large blocky pixels are displayed. Furthermore, if the user zooms in temporally to view frames in greater temporal detail than is provided in the video sequence, the perceived motion is choppy. It would be interesting to explore the use of higher order filters to produce smoother interpolations when the user views regions at higher resolution than is represented.

Algorithms for Combining Video Clips

When combining video sequences, the various elements may need to be registered with respect to one another, requiring that they be translated and scaled within their own coordinate frames. The basic operations of translation and scaling for quadtrees are known in the prior art. However, as with drawing frames, these operations should take advantage of the temporal coherence encoded in the uplinks of the data structure used in the present invention. For example, to translate the fan and lamp video of FIG. 3 a bit to the left, the regions of the video that contain the lamp should only be translated in the root node of the Time Tree, and all the time-children must inherit that translation.

The following routine translates a multiresolution video clip, rooted at time node C, by an amount (dx, dy) at level $l_{tran}$ to produce a resulting Time Tree C'. In order to handle uplinks, the routine is also passed the parent time node P of C, as well as the result P' of (previously) translating P by the given amount. In the top-level call to the procedure, the parameters P and P' are passed as NULL, and the Time Tree C' initially points to an image node containing just a single clear pixel. As the procedure writes its result into C', the translated image tree is developed (and padded with clear pixels as it is extended).

```
procedure TranslateTimeTree(C, C', P, P', dx, dy, l_tran):
    TranslateFrame(C.frame, C'.frame, P.frame, P'.frame, dx, dy, l_tran, 0,
        0, 0) ComputeSpatialAverages(C'.frame)
    for each Half ∈ {Half1, Half2} of Timetree do
        if C.Half ≠ NULL then
            TranslateTimeTree(C.Half, C'.Half, C, C', dx, dy, l_tran)
        end if
    end for
end procedure
```

The steps of this procedure are shown in the flowchart of FIG. 18. A block 230 calls the TranslateFrame function, with parameters C.frame, C'.frame, P.frame, P'.frame, dx, dy, $l_{tran}$, 0, 0, and 0. Next, a block 232 calls the ComputeSpatialAverages function with the parameter C'.frame. In a block 234, the variable half is set to Half1 of the TimeTree. A decision block 236 determines if C.Half is null, and if so, a block 238 calls the TranslateTimeTree function, with the parameters C.Half C'.Half C, C', dx, dy, and $l_{tran}$. Then, a block 240 sets half to Half2 of the TimeTree. A positive response to decision block 236 also leads to block 240. A decision block 242 again determines if C.Half is equal to null, and if not, a block 244 again calls the TranslateTimeTree( ) function. Thereafter, or if there is a positive response to decision block 242, the routine terminates.

The call to ComputeSpatialAverages( ) in the above procedure calculates average colors in the internal nodes of the image tree, using code similar to the CreateFrame( ) referenced above. The TranslateFrame( ) routine translates a single image tree c by an amount (dx, dy) at level $l_{tran}$. In general, the translation can cause large regions of constant color (leaves high in c) to be broken up across many nodes in the resulting tree c'. To handle the uplinks, it is necessary to pass the time-parent p of c, as well as the result p' of (previously) translating p, into the procedure. Also, arguments x, y and l (initially all 0), which keep track of the location and level of node c, must be passed into the procedure.

```
procedure TranslateFrame(c, c', p, p', dx, dy, l_tran, x, y, l):
    if c.Type = COLOR or c.uplink.linked or l_tran = l then
```

-continued

```
        w ← 2^l tran^-1
        r ← Rectangle(w · x + dx, w · y + dy, w, w, l_tran)
        PutRectInTree(c, c', p', r, 0, 0, 0)
    else
        for each i, j ∈ {0, 1} do
            TranslateFrame(c.child[i, j], c', p.child[i, j], p', dx,
                                                dy, l_tran, 2x + i,
                                                2y + j, l + 1)
        end for
    end if
end procedure
```

With reference to FIG. 19, the logic for this procedure is illustrated in a flowchart. A decision block 250 determines if c.Type is equal to a color value, and if not, a decision block 252 determines if c.uplink.linked has a Boolean true value. A negative response to decision block 252 leads to a decision block 254, which determines if $l_{tran}$ is equal to l. If so, or following an affirmative response to either of decision blocks 250 and 252, the logic advances to a block 256, in which w is set to $2^{l_{tran}-1}$. A block 258 sets r to a function Rectangle( ), and a block 260 calls a function PutRectInTree( ). The procedure then terminates.

A negative response to decision block 254 leads to blocks 262, 264, 266, and 268, each of which calls the function TranslateFrame( ), for different parameter values. The procedure again then terminates.

The above procedure recursively descends image tree c, pausing to copy any "terminal" squares that it encounters as it goes. There are three kinds of terminal squares: large regions of constant color, subtrees that hang from level $l_{tran}$, and uplinks. In the first two cases, the source is copied from the original tree, whereas in the latter case, it is copied from the time-parent. A square's size and position are combined in a single structure Rectangle(x, y, width, height, $l_r$), the coordinates of which are relative to the level $l_r$. When the procedure finds one of these squares, the square is copied into the resulting tree using the following procedure:

```
procedure PutRectInTree(c, c', p', r, x, y, l):
    coverage ← CoverageType(r, x, y, l)
    if coverage = COMPLETE then
        if c.type = COLOR or not c.uplink.linked then
            c' ← c
        else
            c' ← p'
            c'.uplink.linked ← TRUE
        end if
    else if coverage = PARTIAL then
        for each i, j ∈ f{0, 1} do
            PutRectInTree(c, c'.child[i, j], p'.child[i, j], r, 2x + i, 2y +
                j, l + 1)
        end for
    end if
end procedure
```

Turning to FIG. 20, a block 280 sets Coverage to the function Covertype, with the parameters, r, x, y, and l. A decision block 282 determines if the Coverage is complete, and if not, a decision block 284 determines if it is partial. If not, the procedure terminates. An affirmative result from decision block 284 leads to blocks 286, 288, 290, and 292, which call the routine PutRectInTree( ) for the different values of the parameters. The routine then terminates.

An affirmative response to decision block 282 leads to a decision block 294, which determines if the variable c.type is equal to a color value. If not, a decision block 296 determines if c.uplink.linked is true, and if so, a block 298 sets c' equal to p'. A block 300 then sets c'.uplinked.linked to true, before terminating the routine. Following either an affirmative response from decision block 294 or a negative response from decision block 296, a block 302 sets c' equal to c, and then the procedure also terminates.

The above procedure recursively descends the result tree c' to find those nodes that are completely covered by the given rectangle. The function CoverageType(r, x, y, l) returns a code indicating whether rectangle r completely covers, partially covers, or does not cover pixel (x, y) at level l. For those nodes that are completely covered, PutRectInTree( ) copies either a color or a pointer, depending on the type of node being copied. If the node is a color, then the color is simply copied to its new position. If the node is a pointer but not an uplink, the routine copies the pointer, which essentially moves an entire subtree from the original tree. Finally, if the node is an uplink, the routine copies the corresponding pointer from the (already translated) time-parent p'. Thus, it is necessary to descend the result tree c' and its time-parent p' in lock-step in the recursive call.

As with DrawImage( ), the complexity of TranslateFrame( ) is related to the number of nodes it copies using PutRectInTree( ). The latter procedure is dependent on the number of nodes it encounters when copying a rectangle. Since the former call makes a single pass over the source quadtree c, and the collective calls to the latter procedure make a single pass over the resulting image tree c', the overall complexity is proportional to the sum of the complexities of c and c'.

Scaling a Video Clip

In the following procedure, a Time Tree is scaled by some integer factors $s_x$ in the x direction and $s_y$ in y. Note that to shrink a video frame by any power of two in both x and y, it is only necessary to insert more image parent nodes above the existing image root, filling in any new siblings with "clear." Conversely, to magnify a video frame by any power of two, it is necessary to simply scale all other videos down by that factor, since only their relative scales are of interest. Thus, scaling both x and y by any power of two is essentially free, and the scales may be viewed as being $s_x/2^l$ and $s_y/2^l$ for any (positive or negative) l. For efficiency, it is best to divide both $s_x$ and $s_y$ by their greatest common power-of-two divisor.

The algorithms for scaling multiresolution video are structurally very similar to those for translation. The two main differences are that they copy scaled (rather than translated) versions of the source tree into the destination tree, and that they must descend down to the leaves of the image trees. The specific pseudocode for scaling a video clip is thus not included herein. The time complexity of scaling is the same as translation, i.e., linear in the size of the input and output.

Compositing Two Video Clips

The final operation addressed herein is compositing two Time Trees A and B using the compositing operation op:

```
function CompositeTimeTrees(A, B, op): returns TimeTree
    for each Half ∈ {Half1, Half2} do
        if A.Half ← NULL and B.Half ← NULL then
            Result.Half ← NULL
        Else
            Ahalf ← A.Half
            Bhalf ← B.Half
```

-continued

```
            if Ahalf = NULL then Ahalf ← NewUplinkNode(A)
            end if
                if Bhalf = NULL then Bhalf ← NewUplinkNode(B)
            end if
                Result.Half ← CompositeTimeTrees(Ahalf, Bhalf,
    op)
            end if
    end for
    Result.frame ← CompositeFrames(A.frame, B.frame, FALSE,
FALSE,
                    Result.Half1.frame,
                    Result.Half2.frame, op)
    return Result
end function
```

In FIG. 21, a block 310 implements a first step of the above logic by setting half to Half1. A decision block 312 then determines if both halves are done, and if not a decision block 314 determines if A.Half is null. If so, the logic proceeds to a decision block 316, wherein the logic determines if B.Half is null. If so, a block 318 sets Result.Half to null, followed by a block 320, which sets half to Half2. Following block 320, the logic loops back to decision block 312. An affirmative response to decision block 312 leads to a block 322. In this block, Result.frame is set to the function CompositeFrames( ), which carries out the composite operation. A block 324 then returns the Result, prior to the procedure terminating.

A negative response to decision block 314 or decision block 316 leads to a block 326. In block 326, AHalf is set equal to A.Half, followed by a block 328, in which BHalf is set equal to B.Half. A decision block 330 determines if AHalf is null. If so, a block 332 sets AHalf to UewUpLinkNode(A). Following block 332 or a negative result from decision block 330, a decision block 334 determines if BHalf is null, and if so, a block 336 sets BHalf to NewUpLinkNode(B). After block 336 or if the result in decision block 334 is negative, a block 338 sets Result.Half to the function CompositeTimeTrees( ). The logic then proceeds with block 330.

The preceding function recursively traverses A and B in a bottom-up fashion, compositing child time nodes first, then their parents. If one of A or B has more temporal resolution than the other, then a temporary node is created by the function NewUplinkNode( ). Invoking this function with the argument A creates a new TimeNode containing a single ImageNode, each of whose four children is an uplink pointing to its "time-parent" in A.

The following function works on two image trees a and b, taking a pair of arguments aUp and bUp that are set to FALSE in the top-level call; these flags are used to keep track of whether a and b are really parts of a time-parent. The function also takes a pair of arguments $c_1$ and $c_2$ that are the time-children of the resulting tree. In order to pass $c_1$ and $c_2$, the CompositeTimeTrees( ) function must have already computed these time-children, which is why it makes a bottom-up traversal of the Time Tree.

```
function CompositeFrames(a, b, aUp, bUp, c₁, c₂, op): returns ImageNode
    if a.uplink.linked then aUp ← TRUE end if
    if b.uplink.linked then bUp ← TRUE end if
    if aUp and bUp then return NULL end if
    if a.Type = COLOR and b.Type = COLOR then
        if c₁ = NULL or c₂ = NULL then
            return ImageNode(COLOR, CompositePixels(a, b,
```

```
        op))
      else
        return ImageNode(COLOR, Average(c_1.avgcolor,
      c_2.avgcolor)) end if
    end if
    for each i, j ∈ {0, 1} do
      result.child[i, j] ← CompositeFrames(GC(a, i, j), GC(b, i, j),
    aUp, bUp,
              GC(c_1, i, j),
            GC(c_2, i, j), op)
    end for
    result.avgcolor ← AverageChildColors(result)
    return result
end function
```

As shown in FIG. 22, this logic begins processing with a decision block 350, which determines if a.uplink.linked is true and if so, a block 352 sets aUp to true. Following block 352 or a negative response to decision block 350, a decision block 354 determines if b.uplink.linked is true, and if so, a block 356 sets bUp to true. After block 356, or following a negative response to decision block 354, a decision block 358 determines if both aUp and bUp are true, and if so, a block 360 returns true before the procedure terminates. A negative response to decision block 358 leads to a decision block 362, which determines if a.Type and b.Type are color values. If so, a decision block 364 determines if either $c_1$ is null or $c_2$ is true. An affirmative response leads to a block 366, which returns ImageNode(Color, CompositePixels(a, b, op)), before the process terminates. A negative response to decision block 364 leads to a block 368, which returns ImageNode(Color, Average($c_1$.avgcolor, $c_2$.avgcolor)).

A negative response to decision block 362 leads to a blocks 370, 372, 374, and 376, which set result.child[0,0] to CompositeFrames( ), with corresponding parameters. A block 378 then sets result.avgcolor to AverageChildColors (result). This result is returned in a block 380, before the procedure terminates.

Two image trees are composited by traversing them recursively, in lockstep, compositing any leaf nodes. Child colors are propagated up to parents to construct internal averages. The helper function GC( ) (for "GetChild" or "GetColor") simply returns its argument node if it is a color, or the requested child if it is a subtree. There are two subtleties to this algorithm. The first is that when the routine finds some region of the result for which both a and b are uplinks (or subtrees of uplinks), then it can assume that the result will be an uplink as well; in this case, it simply returns NULL. Later, after all of the frames in the Time Tree have been composited, a simple function is invoked that traverses the Time Tree once, replacing all NULL pointers with the appropriate uplink. (This assignment cannot occur in CompositeFrames( ) because the nodes to which the uplinks will point have not yet been computed.) The second subtlety is that if time-child $c_1$ or $c_2$ is NULL, the resulting image node has no time-children, i.e., either the node is part of an image tree that hangs from a leaf of the Time Tree, or its children are uplinks. In either case, the compositing operation is performed. If, on the other hand, $c_1$ and $c_2$ exist, then the process is working on an internal node in the Time Tree and can simply average $c_1$ and $c_2$.

The compositing operation described in this section creates a new Time Tree that uses uplinks to take advantage of any temporal coherence in the resulting video. Since this resulting Time Tree is built using two bottom-up traversals, the complexity of creating it is linear as a function of the size of the input trees.

Computer System Suitable for Implementing the Present Invention

With reference to FIG. 23, a generally conventional personal computer 530 is illustrated, which is suitable for use in connection with practicing the present invention. Alternatively, a portable computer, or workstation coupled to a network and server may instead be used. Personal computer 530 includes a processor chassis 532 in which are mounted a floppy disk drive 534, a hard drive 536, a motherboard populated with appropriate integrated circuits (not shown), and a power supply (also not shown), as are generally well known to those of ordinary skill in the art. A monitor 538 is included for displaying graphics and text generated by software programs that are run by the personal computer. A mouse 540 (or other pointing device) is connected to a serial port (or to a bus port) on the rear of processor chassis 532, and signals from mouse 540 are conveyed to the motherboard to control a cursor on the display and to select text, menu options, and graphic components displayed on monitor 538 by software programs executing on the personal computer. In addition, a keyboard 543 is coupled to the motherboard for user entry of text and commands that affect the running of softwvare programs executing on the personal computer.

Personal computer 530 also optionally includes a compact disk-read only memory (CD-ROM) drive 547 into which a CD-ROM disk may be inserted so that executable files and data on the disk can be read for transfer into the memory and/or into storage on hard drive 536 of personal computer 530. Personal computer 530 may be coupled to a local area and/or wide area network as one of a plurality of such computers on the network.

Although details relating to all of the components mounted on the motherboard or otherwise installed inside processor chassis 532 are not illustrated, FIG. 24 is a block diagram showing some of the functional components that are included. The motherboard has a data bus 533 to which these functional components are electrically connected. A display interface 535, comprising a video card, for example, generates signals in response to instructions executed by a central processing unit (CPU) 553 that are transmitted to monitor 538 so that graphics and text are displayed on the monitor. A hard drive and floppy drive interface 537 is coupled to data bus 533 to enable bi-directional flow of data and instructions between data bus 533 and floppy drive 534 or hard drive 536. Software programs executed by CPU 553 are typically stored on either hard drive 536, or on a floppy disk (not shown) that is inserted into floppy drive 534. The software instructions for implementing the present invention will likely be distributed either on floppy disks, or on a CD-ROM disk or some other portable memory storage medium. The machine instructions comprising the software application that implements the present invention will also be loaded into the memory of the personal computer for execution by CPU 553.

A serial/mouse port 539 (representative of the two serial ports typically provided) is also bi-directionally coupled to data bus 533, enabling signals developed by mouse 540 to be conveyed through the data bus to CPU 553. It is also contemplated that a universal serial bus (USB) port may be included and used for coupling a mouse and other peripheral devices to the data bus. A CD-ROM interface 559 connects CD-ROM drive 547 to data bus 533. The CD-ROM interface may be a small computer systems interface (SCSI) type interface or other interface appropriate for connection to and operation of CD-ROM drive 547.

A keyboard interface 545 receives signals from keyboard 543, coupling the signals to data bus 533 for transmission to CPU 553. Optionally coupled to data bus 533 is a network interface 550 (which may comprise, for example, an ETHERNET™ card for coupling the personal computer or workstation to a local area and/or wide area network).

When a software program such as that used to implement the present invention is executed by CPU 553, the machine instructions comprising the program that are stored on a floppy disk, a CD-ROM, a server (not shown), or on hard drive 536 are transferred into a memory 551 via data bus 533. These machine instructions are executed by CPU 553, causing it to carry out functions determined by the machine instructions. Memory 551 includes both a nonvolatile read only memory (ROM) in which machine instructions used for booting up personal computer 530 are stored, and a random access memory (RAM) in which machine instructions and data defining an array of pulse positions are temporarily stored.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for storing video data that comprise multiple frames so as to provide independent image resolution and time resolution when displaying the video data, comprising the steps of:

(a) providing a data structure for storing the video data in a memory medium;

(b) encoding a flow of time for the video data in a first portion of the data structure; and (c) encoding a spatial decomposition of he multiple frames of the video data in a second portion of the data structure that is linked to the first portion of the data structure, said first and second portions of the data structure being decoupled sufficiently from each other so as to enable the video data to be read from the memory medium and displayed with separately selectively variable spatial resolutions and temporal resolutions, whereby the spatial resolution is generally selectively variable independent of the temporal resolution, and the temporal resolution is generally selectively variable independent of the spatial resolution.

2. The method of claim 1, further comprising the step of writing the video data in the data structure to the memory medium for storage.

3. The method of claim 2, wherein a storage required to store the video data at a selected spatial resolution and a selected temporal resolution is substantially dependent upon said resolution.

4. The method of claim 1, further comprising the steps of:

(a) transmitting the video data in the data structure over a communication link; and (b) automatically varying at least one of the spatial resolution and the temporal resolution of the video data being transmitted to fit within an available bandwidth of the communication link.

5. The method of claim 4, wherein the available bandwidth of the communication link varies during transmission of the video data, further comprising the step of automatically varying said at least one of the spatial resolution and the temporal resolution in accord with the varying bandwidth of the communication link.

6. The method of claim 1, further comprising the steps of:

(a) displaying the video data stored on the medium in the data structure on a display device having a limited resolution; and (b) automatically varying the spatial resolution of the video data being played to conform to the limited resolution of the display device.

7. The method of claim 1, further comprising the step of providing a fast forward of the video data stored in the data structure, by varying the temporal resolution of the video data displayed in a forward play direction.

8. The method of claim 1, further comprising the step of providing a fast reverse of the video data stored in the data structure, by varying the temporal resolution of the video data displayed in a reverse play direction.

9. The method of claim 1, further comprising the step of enabling searching of the video data stored in the data structure, by varying the temporal resolution of the video data when displayed, so that frames of the video data are displayed at a desired rate that is substantially faster or slower than they would be displayed when the video data are not being searched.

10. The method of claim 1, further comprising the step of resampling video data that are at a relatively higher resolution to produce additional video data having one of a relatively lower temporal resolution and a lower spatial resolution for storage in the data structure.

11. The method of claim 1, in which the video data stored in the data structure have a dynamically varying spatial resolution and a dynamically varying temporal resolution.

12. The method of claim 1, in which the data structure comprises a sparse binary tree for encoding the flow of time and sparse quadtrees for encoding the spatial decomposition of frames of the video data.

13. The method of claim 1, further comprising the step of enabling lossy compression of the data structure.

14. A system for encoding and displaying video data at generally independent varying spatial and temporal resolutions, comprising:

(a) a memory for storing machine instructions and the video data;

(b) a display for displaying the video data; and (c) a processor coupled to the memory and to the display, said processor carrying out a plurality of functions defined by the machine instructions, including:

(i) creating a data structure in the memory for storing the video data;

(ii) encoding a flow of time for the video data in a first portion of the data structure; and (iii) encoding a spatial decomposition of multiple frames of the video data in a second portion of the data structure that is linked to the first portion of the data structure, said first and second portions of the data structure being decoupled sufficiently from each other so as to enable the video data to be read from the memory and displayed on the display with separately selectively variable spatial resolutions and temporal resolutions, whereby the spatial resolution is generally selectively variable independent of the temporal resolution, and the temporal resolution is generally selectively variable independent of the spatial resolution.

15. The system of claim 14, wherein the machine instructions further cause the processor to:

(a) display the video data stored in the memory using the data structure on the display; and (b) automatically varying the spatial resolution of the video data being played to conform to a limited resolution of the display.

16. The system of claim 14, wherein the machine instructions further cause thee processor to enable a fast forward of the video data stored in the memory using the data structure, by varying the temporal resolution of the video data displayed in a forward play direction on the display.

17. The system of claim 14, wherein the machine instructions further cause the processor to enable a fast reverse of the video data stored in the memory using the data structure, by varying the temporal resolution of the video data displayed in a reverse play direction.

18. The system of claim 14, wherein the machine instructions further cause the processor to enable a search of the video data stored in the memory using the data structure, by varying the temporal resolution of the video data when displayed, so that frames of the video data are displayed on the display at a desired rate that is substantially faster or slower than the video data would be displayed when not being searched.

19. The system of claim 14, in which the machine instructions cause the processor to dynamically vary at last one of the temporal resolution and spatial resolution in response to a varying processing load on the processor.

20. The system of claim 14, further comprising a communication link for conveying encoded video data to a remote site, wherein the machine instructions cause the processor to dynamically vary at least one of the temporal resolution and the spatial resolution as a function of a bandwidth of the communication link.

21. The system of claim 14, in which the machine instructions provide for encoding an arbitrarily high level of resolution for at least one of the spatial resolution and the temporal resolution.

* * * * *

UNITED STATES PATENT AND TRADEMARK OFFICE
CERTIFICATE OF CORRECTION

PATENT NO. : 6,631,240 B1
DATED : October 7, 2003
INVENTOR(S) : Salesin et al.

It is certified that error appears in the above-identified patent and that said Letters Patent is hereby corrected as shown below:

Column 11,
Line 59, "outline" should read -- routine --

Column 14,
Line 29, "Lo" should read -- to --

Column 23,
Line 35, "he" should read -- the --

Column 25,
Line 5, "thee" should read -- the --

Column 26,
Line 4, "last" should read -- least --

Signed and Sealed this

Twenty-fourth Day of February, 2004

JON W. DUDAS
*Acting Director of the United States Patent and Trademark Office*